(12) United States Patent
Pisupati et al.

(10) Patent No.: US 7,096,463 B2
(45) Date of Patent: Aug. 22, 2006

(54) SYSTEM AND APPARATUS FOR DYNAMICALLY UPGRADING CONCENTRATED EXECUTABLE COMPUTER SOFTWARE CODE

(75) Inventors: Ravikumar Pisupati, San Jose, CA (US); Dongni Chen, Sunnyvale, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 677 days.

(21) Appl. No.: 10/300,272

(22) Filed: Nov. 20, 2002

(65) Prior Publication Data

US 2004/0098712 A1 May 20, 2004

(51) Int. Cl.
*G06F 9/44* (2006.01)
(52) U.S. Cl. ..................... 717/168; 717/111
(58) Field of Classification Search ............... 717/171, 717/110, 111, 116, 124, 173, 139, 140, 158, 717/165, 118, 169, 170; 707/100, 101, 204
See application file for complete search history.

(56) References Cited

U.S. PATENT DOCUMENTS

| | | | | | |
|---|---|---|---|---|---|
| 6,026,237 | A | * | 2/2000 | Berry et al. | 717/130 |
| 6,072,953 | A | * | 6/2000 | Cohen et al. | 717/166 |
| 6,081,665 | A | * | 6/2000 | Nilsen et al. | 717/116 |
| 6,163,780 | A | * | 12/2000 | Ross | 707/101 |
| 6,260,187 | B1 | * | 7/2001 | Cirne | 717/110 |
| 6,535,894 | B1 | * | 3/2003 | Schmidt et al. | 707/204 |
| 6,637,025 | B1 | * | 10/2003 | Beadle et al. | 717/148 |
| 6,658,421 | B1 | * | 12/2003 | Seshadri | 707/100 |
| 6,915,510 | B1 | * | 7/2005 | Tock et al. | 717/165 |
| 2005/0010917 | A9 | * | 1/2005 | Rajaram et al. | 717/173 |

* cited by examiner

*Primary Examiner*—Wei Zhen
*Assistant Examiner*—Anna Deng

(57) ABSTRACT

In upgrading a concentrated executable computer code with an upgrade code, indexed lists are created for the concentrated code and for the upgrade code. The indexed lists have index references for code identifiers of code structures in the concentrated code and the upgrade code, respectively. The indexed lists are stored in a virtual table. The concentrated code is integrated with the upgrade code to form an integrated code. The virtual table contains an operable part referable by the integrated code such that when a code structure being executed originates from the concentrated code the indexed list for the concentrated code is stored in the operable part of the virtual table, and when a code structure being executed originates from the upgrade code the indexed list for the upgrade code is stored in the operable part of the virtual table.

18 Claims, 22 Drawing Sheets

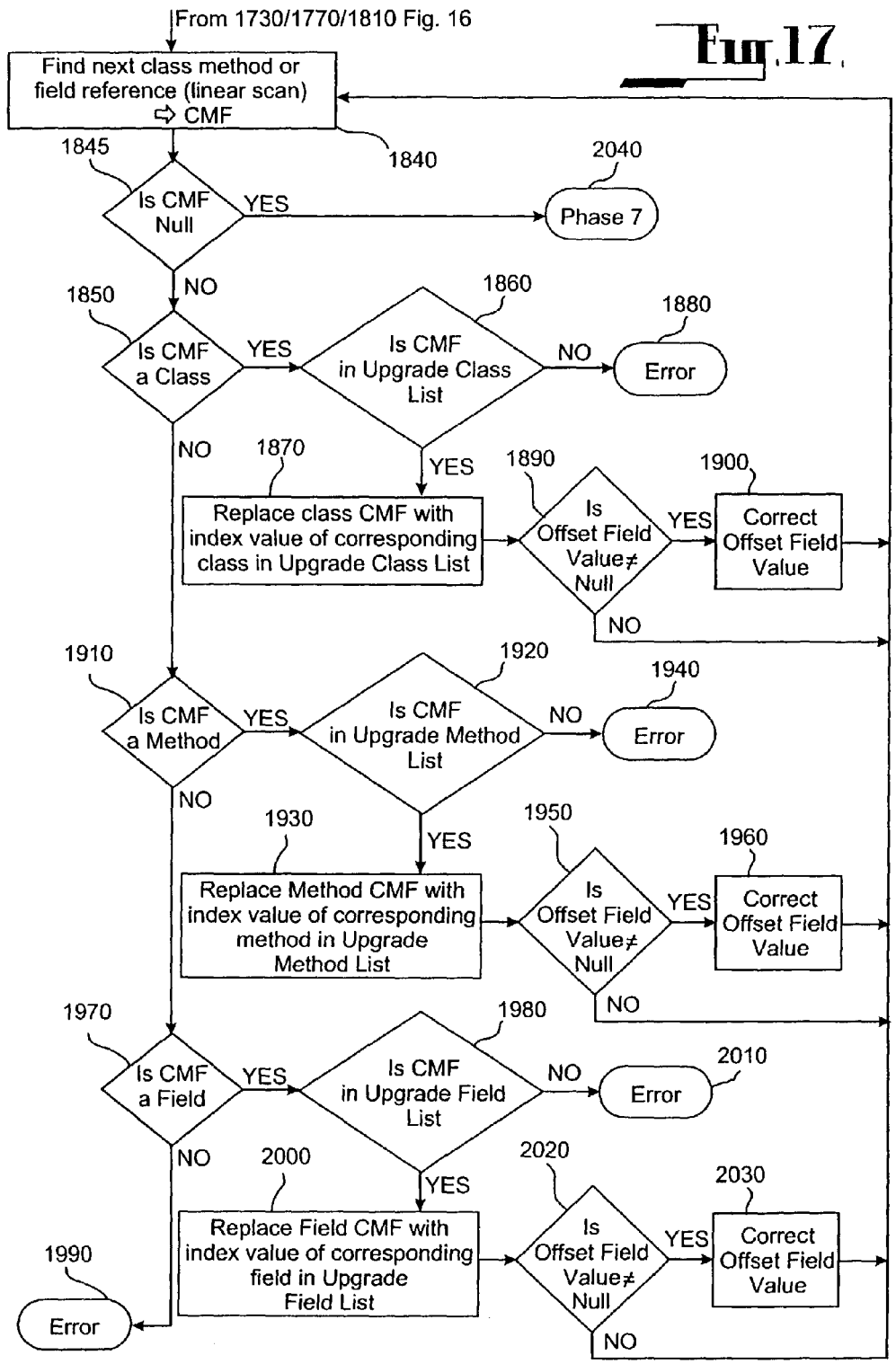

SYSTEM AND APPARATUS FOR DYNAMICALLY UPGRADING CONCENTRATED EXECUTABLE COMPUTER SOFTWARE CODE

FIELD OF THE INVENTION

The present invention relates to a system and apparatus for dynamically upgrading concentrated executable computer software code. The invention is particularly useful in upgrading bytecode and computer software written in an object-oriented language, such as JAVA.

DICTIONARY

The following dictionary is to be used in interpreting this specification:
"bytecode" is computer software code.
"class", or "classes", are code segments that contain method definitions and field specifications.
"comprise", or variations such as "comprises" or "comprising", will be understood to imply the inclusion of a stated integer or group of integers but not the exclusion of any other integer or group of integers.
"electronic communications network" or "ECN" will be understood to include any computing, multimedia or video system in which a user can remotely access or receive transmissions of bytecode.
"field" is a component of an object in which object data are stored as integers or characters, i.e., variables.
"identifier" means a reference to the name of a unique class, method or field.
"instance", when used in the context of data, refers to data associated with an object.
"method" is code used to perform a particular task, such as modifying data in some way, such as for performing a procedure or a function.
"object" is a collection of fields and methods that operate on fields. An object is also an instance of a class.
"private", when used in the context of data, refers to data generally accessible by a single class.
"public", when used in the context of data, refers to data accessible by multiple classes.
"static", when used in the context of data, refers to data associated with each class.

BACKGROUND OF THE INVENTION

In U.S. Pat. No. 6,163,780, Hewlett-Packard Company of Palo Alto, Calif., describes a system for concentrating executable computer software code. This system involves parsing the computer software code by means of concentrating software. The concentrating software achieves this by a series of scans of the computer software code.

The first scan identifies all unique classes referenced in the computer software code and includes the identifier of each such class into a "ClassList". The second scan searches for all unique methods (the identifiers of which are stored in a "MethodList") and the third scan searches for all unique Fields (the identifiers of which are stored in a "FieldList").

Every class identified in the ClassList is then scanned to determine whether there are references to further classes not recorded in the ClassList. If so, then the identifier for such classes is added to the ClassList. The process is then repeated in relation to the newly added classes. In this manner, all unique classes referenced in the computer software code are identified in the ClassList.

Once this scan has been completed, every class in the ClassList is again scanned, but this time to determine any further methods not recorded in the MethodList. If a method is found that is not included in the MethodList, then the identifier for the method is added to the MethodList. The process continues until all classes in the ClassList have been scanned for further methods.

A further scan is used to identify all further fields not included in the FieldList and add their identifier to the FieldList. This scan involves traversing all classes in the ClassList and every method in these classes to identify further fields.

The ClassList, MethodList and FieldList are then each sorted and reformatted into a canonical list form. Each class, method and field in the ClassList, MethodList and FieldList, respectively, is also assigned a unique index reference (typically an integer corresponding to the position of the corresponding identifier within the appropriate canonical list).

Local data referenced by each method of each class are then stored in an array for each class. The local data reference in each method is then replaced with the index value of the location of the local data in the array. The computer software code can then be executed with class, method and field invocations being resolved as part of the execution process.

The problem with this arrangement is that the use of index references to corresponding canonical lists hinders upgrading of the computer software code. To elaborate, the computer software code is in concentrated form while, typically, the upgrade bytecode will not. However, if the upgrade bytecode is in concentrated form, there is no guarantee that the canonical lists formed from concentration of the upgrade bytecode will be compatible with the canonical lists formed from concentration of the computer software code. There is also no mechanism for allowing the computer software code to be dynamically upgraded.

Accordingly, there is a need to allow concentrated computer software code to be dynamically upgraded without the need to reconcentrate the computer software code.

SUMMARY OF THE INVENTION

An object of the present invention is to provide a system for dynamically upgrading concentrated bytecode. The present invention also provides a system and method for interpreting and executing a dynamically upgraded version of the concentrated bytecode.

It is another object of the present invention to provide a system and method for receiving bytecode comprising the upgrade, concentrating it, transmitting it via a computer network, such as the Internet, and integrating the concentrated bytecode comprising the upgrade with the original concentrated bytecode by means of a virtual table.

By providing a method and system for dynamically upgrading bytecode or computer code, the present invention alleviates to a great extent the need to reconcentrate bytecode or computer code when the bytecode or computer code needs to be upgraded. It also allows the bytecode to be upgraded "on-the-fly".

In a preferred embodiment, list processing and indexing is used to create indexes of various code structures within an upgrade bytecode. Preferably, index listings for each of the code structures are created. The index listings contain listings of identifiers corresponding to the particular instances of the respective code structures in the upgrade bytecode and index references corresponding to each of the identifiers included in the listing. The upgrade bytecode is reduced in size by replacing identifiers representing code structures in the upgrade bytecode with the corresponding index references. The concentrated upgrade bytecode is then integrated with the original concentrated bytecode, and the index listings formed during concentration of the upgrade bytecode are added to the virtual table as a record. Amendments are made to other index listings included in the virtual table to facilitate execution of the upgrade bytecode in conjunction with the original computer software code.

More particularly, in an embodiment applicable to typical JAVA-based computer code, or bytecode, the data structures include classes, method and fields. Listings of the classes, methods and/or fields appearing in the JAVA bytecode are created by systematically reviewing the JAVA upgrade bytecode to identify each instance of a particular class, method and/or field, respectively. These listings are sorted to create respective canonical listings or indexes of the classes, methods and/or fields invoked in the upgrade bytecode. These listings include reference indicators such as index locations or pointers, assigned to each of the classes, methods and/or fields in the respective sorted lists. The JAVA upgrade bytecode is then revised so that the index locations of the classes, methods and/or fields replace the identifiers of the class, methods and/or fields invoked in the upgrade bytecode. The sorted lists are then added to the virtual table as a record and amendments made to previous index listings included in the virtual table to facilitate execution of the upgrade bytecode in conjunction with the original computer software code.

The present invention also provides an interpreter for use in conjunction with the combination of the concentrated upgrade bytecode and the concentrated original bytecode. The interpreter of the present invention can execute bytecode concentrated in accordance with the concentration method or system of the present invention when combined with the concentration method or system of the invention described in U.S. Pat. No. 6,163,780.

These and other features of the invention will be appreciated from review of the following detailed description of the invention, along with the accompanying figures, in which like reference characters refer to like parts throughout.

BRIEF DESCRIPTION OF THE DRAWINGS

FIG. 17 is a flow diagram illustrating a second part of a sixth phase of a method of dynamically upgrading concentrated executable computer software code in accordance with the present invention FIGS. 18 A–C are flow diagram illustrating a seventh phase of a method of dynamically

DETAILED DESCRIPTION OF THE INVENTION

In accordance with the present invention, a system and method are provided for dynamically upgrading concentrated executable computer software code. Such a system and method may be used in conjunction with various known computer languages and interpreters, including JAVA, various dialects of JAVA (such as the version available from Microsoft Corporation), and other languages.

Figure 1:
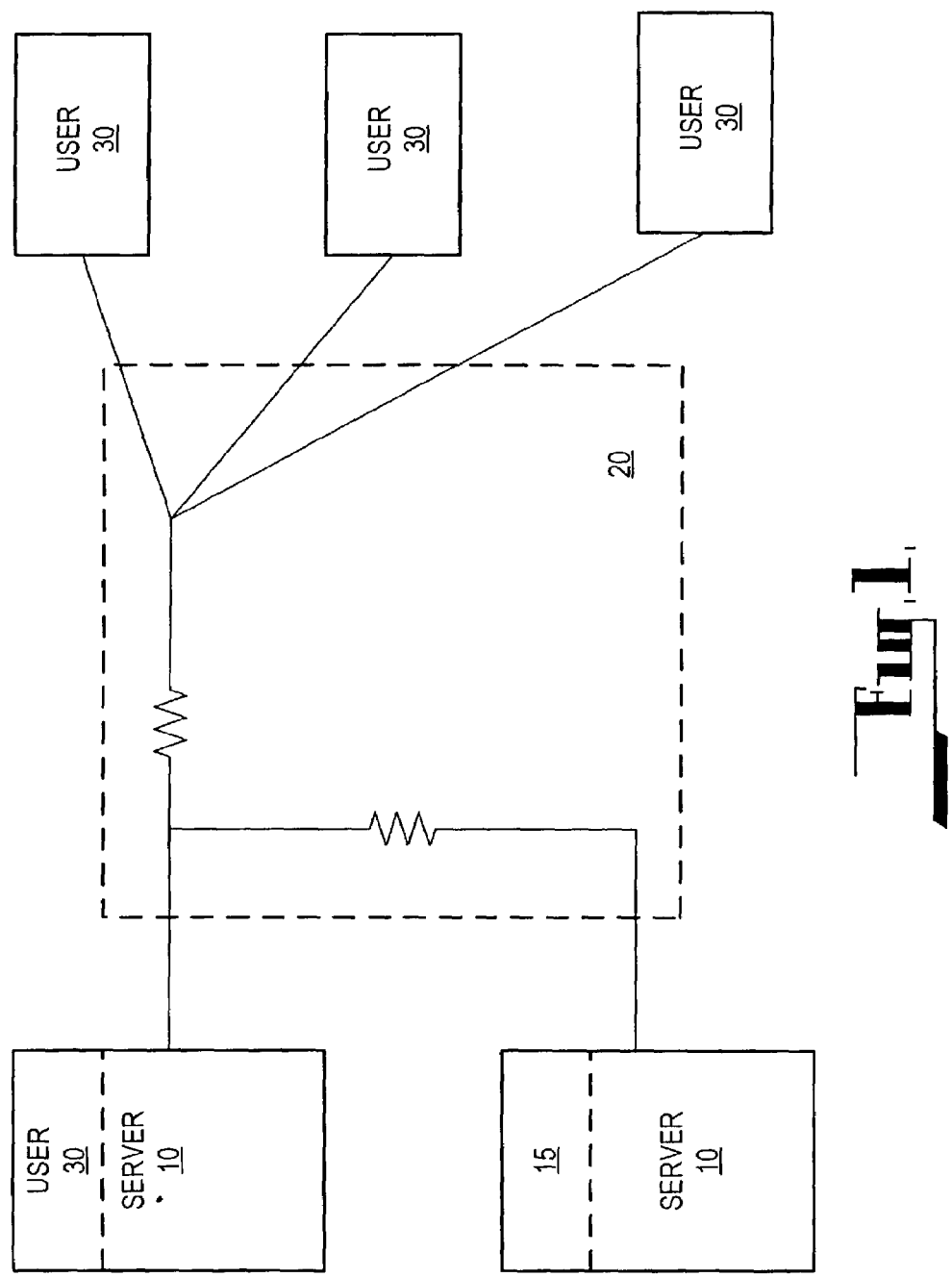
FIG. 1 is a block diagram illustrating an electronic communications network and server systems in accordance with the present invention.

As shown in FIG. 1, the bytecode the subject of the upgrade (referred to hereafter as the "upgrade bytecode") 74 may be stored within a server system 10, which is connected via an ECN 20 with user systems 30. For example, the ECN 20 may include cable transmission networks, telephone networks, an intranet, the Internet, or combinations thereof. It will be understood that an ECN 20 as described herein may include a single server computer, such as a single bulletin board system.

Figure 2:
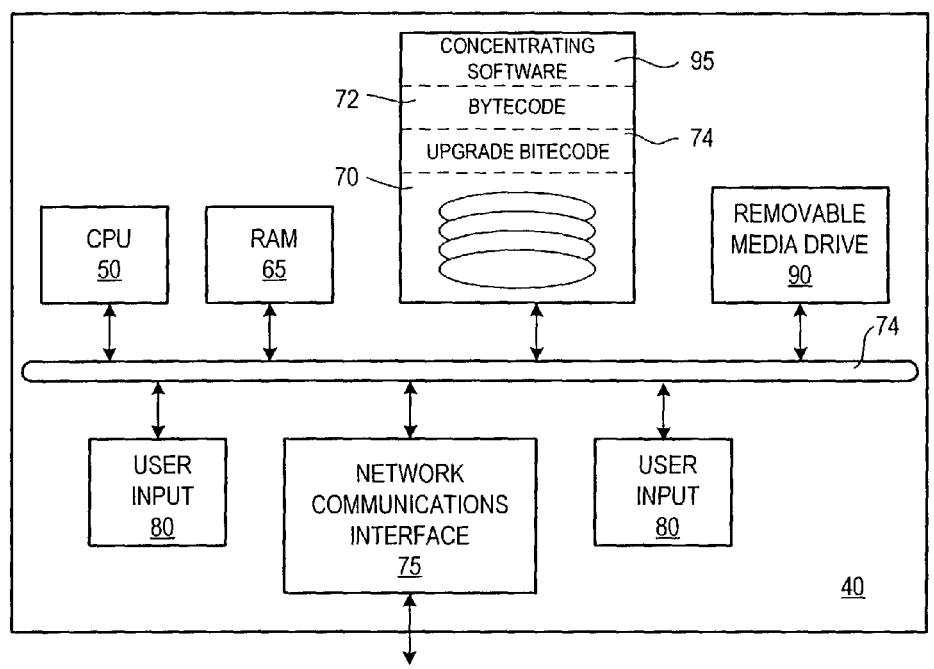
FIG. 2 is a system block diagram in accordance with the present invention.

As illustrated in FIG. 1, a plurality of server systems 10 may be connected to the ECN 20 and a plurality of user systems 30 may also be connected. The servers 10 may perform a number of functions including storing data and/or web page information and so on. In a preferred embodiment, at least one of the servers 10 has an associated memory 15 which stores the upgrade bytecode 74 and which can transmit the upgrade bytecode 74 via the ECN 20 to a user system 30. As utilised in conjunction with the present invention, the server memory 15 stores a concentrated bytecode generated in accordance with the present invention. The server memory 15 may also store a concentrated bytecode generated in accordance with the invention disclosed by U.S. Pat. No. 6,163,780 (as discussed below). The concentrated upgrade bytecode 74 may be transmitted via the ECN 20 to a user system 30. Preferably, the user system 30 contains an API for integrating the concentrated upgrade bytecode 74 with the concentrated original bytecode 72 and an interpreter or other associated tool for receiving the integrated concentrated bytecode 76 and executing it. The concentrated upgrade bytecode 74 generated in accordance with the present invention may be generated on a data processing system 40 as illustrated in FIG. 2. Typical data processing systems which may be used include personal computers, work stations, palm computers, personal digital assistants (PDAs) or even mainframe computers. Also, multiple systems coupled in a computer network, with data files shared among systems on the network, may be employed. Data processing systems can be used to practice the present invention utilising a variety of operating systems (such as for example, Windows™, Windows NT™, Windows 95™, Windows XP™, Sun OS™, OS/2™ and Macintosh OS™) and programming languages.

As illustrated in FIG. 2 a typical data processing system 40 includes a central processing unit (CPU) 50. The CPU 50 is optionally connected via a bus 60 to, among other things, a volatile memory 65 (eg. a RAM), non-volatile memory 70 (such as disk drives, CD-ROMs, flash memory, or data tape), a network communications interface 75 (such as a modem, T1 line interface, ISDN modem or cable modem), a user input device or devices 80 (such as keyboard and/or a pointing or point-and-click device such as a mouse, light pen, touch screen, touch pad), a user output device or devices 87 (such as a video display screen and/or an audio speaker), and a removable media drive 90 (such as a floppy disk drive, CD-ROM drive, PCMCIA device, CD-WORM drive or data tape drive). The data processing system 40 can be a personal computer (PC).

The data processing system 40 may be a free standing system, providing upgrade bytecode 74 concentrated in accordance with the present invention to a server 10 for transmission over the ECN 20. Alternatively, a server 10 may comprise the data processing system 40. Alternatively, the data processing system 40 may be in communication with user systems 30 via the ECN 20. In another embodiment, the data processing system 40 may receive upgrade bytecode 74, concentrate it on-the-fly in accordance with the present invention and then transmit it as such to a server 10, or to another system via the ECN 20.

Although the method and system of the present invention can be used to great advantage within a networked system, as in the illustrated embodiment, it should be clear that the code concentrating method and system of the present invention can also be used to advantage in non-networked computer systems.

The upgrade bytecode 74 to be concentrated in accordance with the present invention can be stored in the RAM 65, the non-volatile memory 70, or on the removable media 90. The upgrade bytecode to be concentrated may also be transmitted on-the-fly to the data processing system 40, which in turn concentrates the upgrade bytecode on-the-fly and re-transmits the concentrated upgrade bytecode 74. In the illustrated embodiment, the upgrade bytecode 74 to be concentrated is stored in the non-volatile memory 70. In some applications, it may be desirable to store the bytecode 72 in RAM for increased access speed.

Figure 3A:
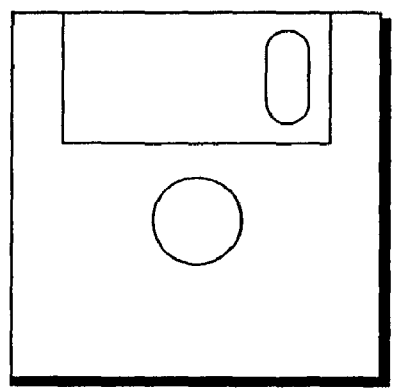
FIGS. 3A–3C are illustrations of various storage media upon which implementing code in accordance with the present invention can be stored.
Figure 3B:
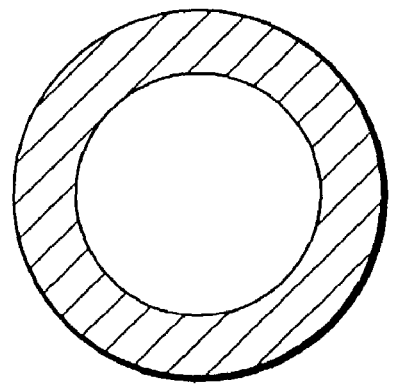
Figure 3C:
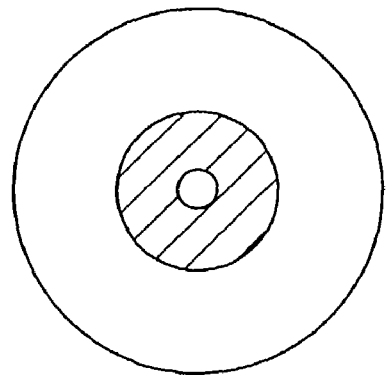
Figure 4:
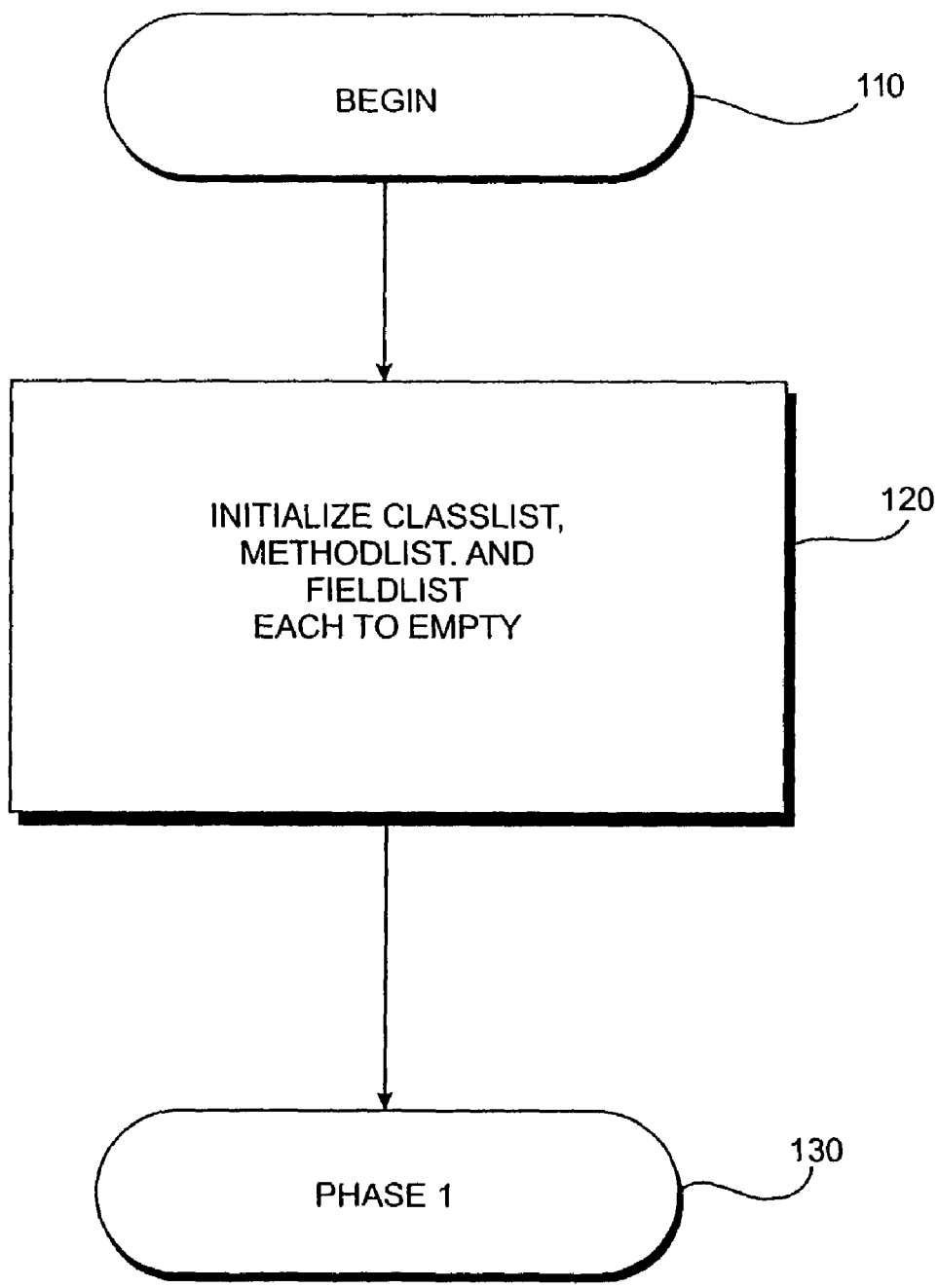
FIG. 4 is a flow diagram of a method of concentrating software in accordance with the invention described in U.S. Pat. No. 6,163,780.
Figure 5:
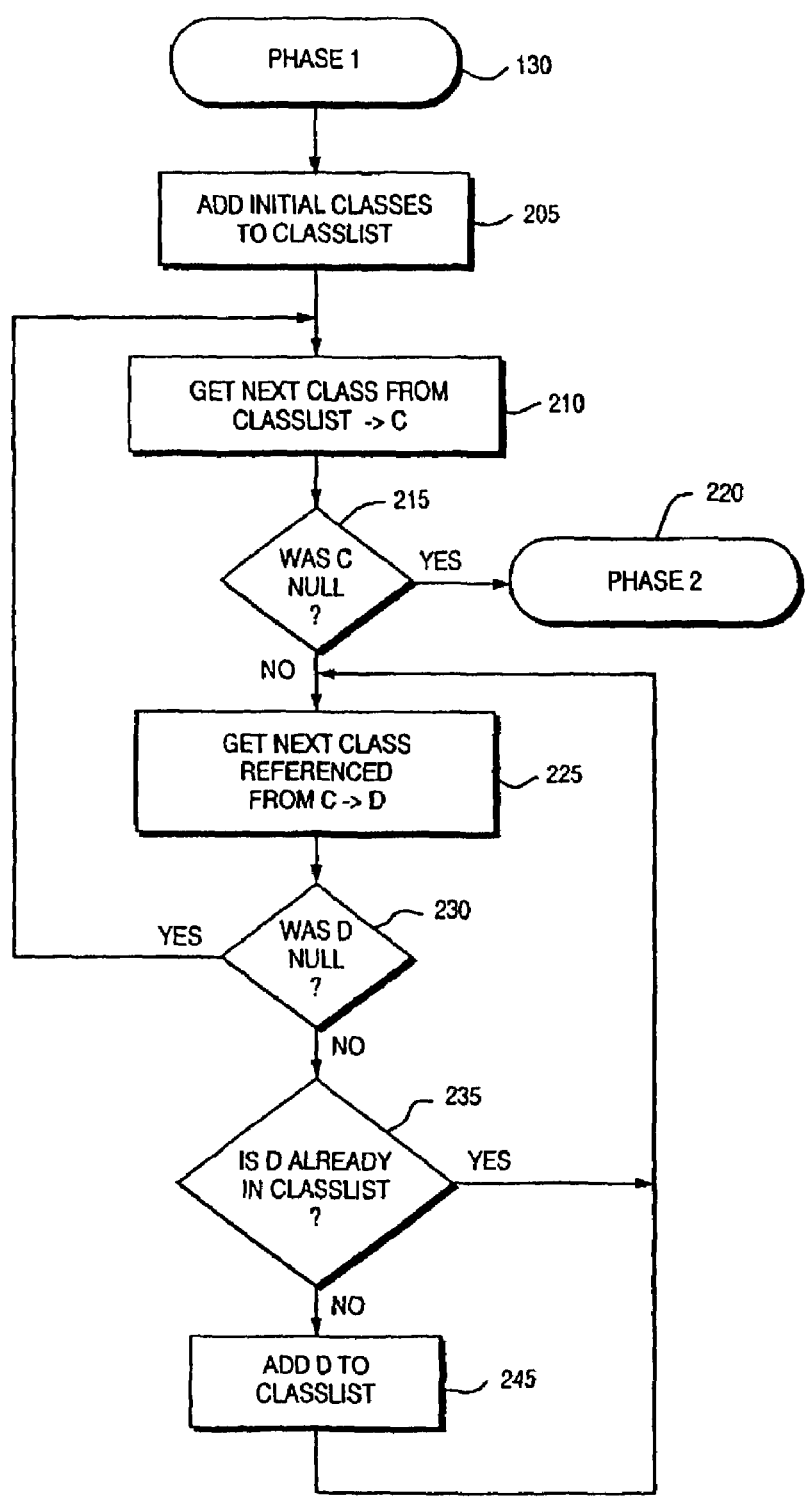
FIG. 5 is a flow diagram illustrating a first phase of a method of concentrating software in accordance with the invention described in U.S. Pat. No. 6,163,780.
Figure 6:
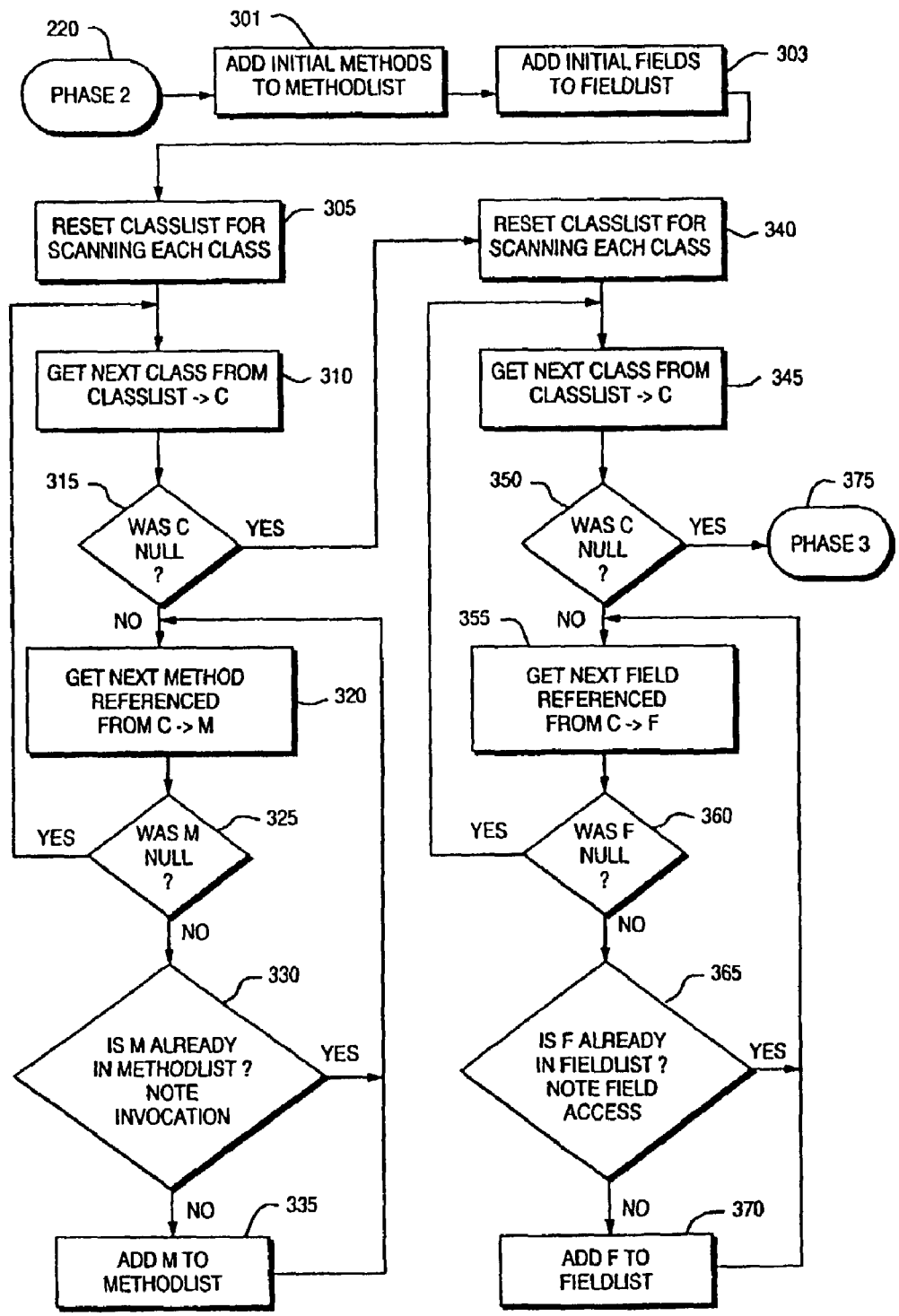
FIG. 6 is a flow diagram illustrating a second phase of a method of concentrating software in accordance with the invention described in U.S. Pat. No. 6,163,780.
Figure 7:
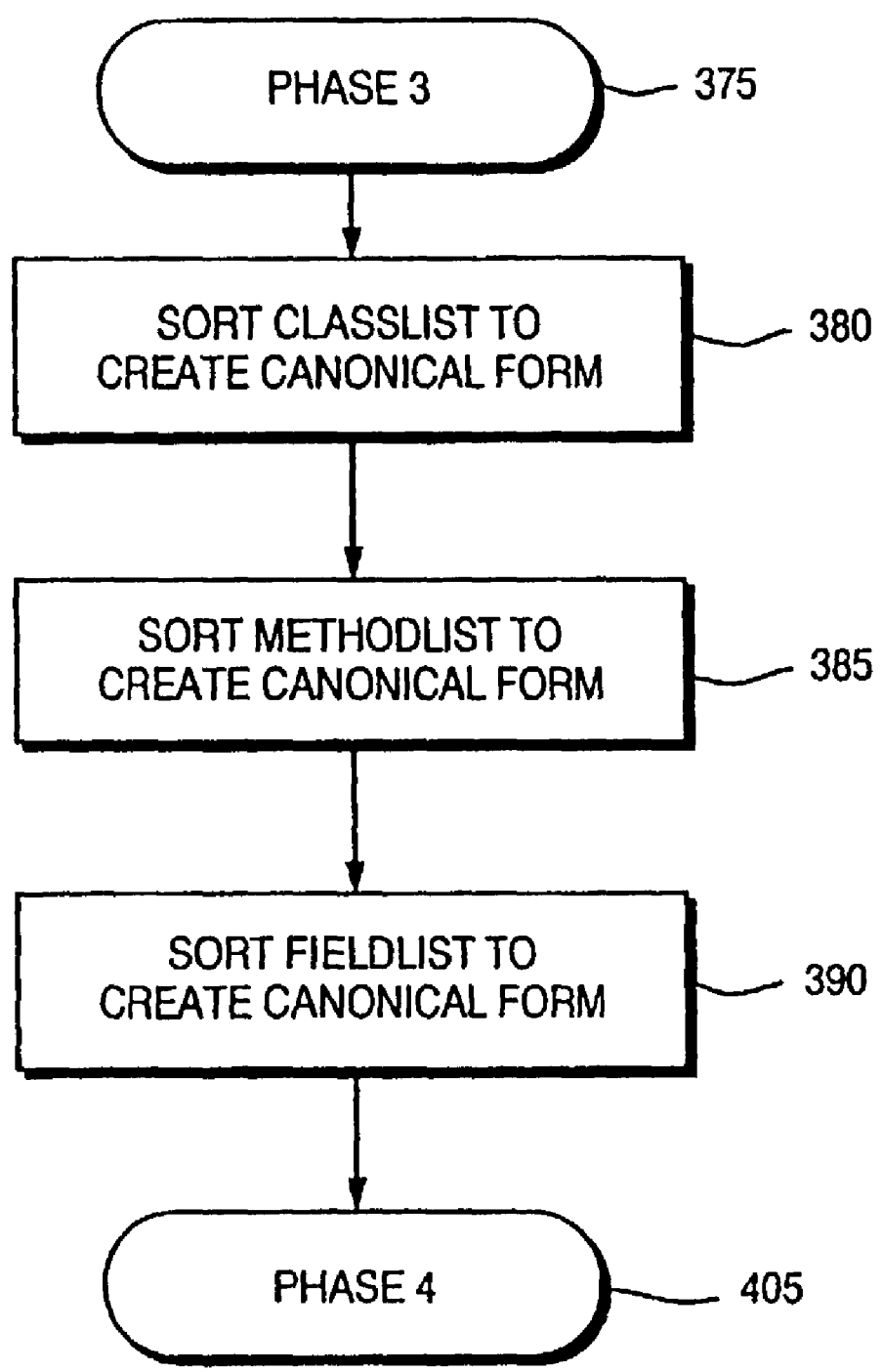
FIG. 7 is a flow diagram illustrating a third phase of a method of concentrating software in accordance with the invention described in U.S. Pat. No. 6,163,780.
Figure 8:
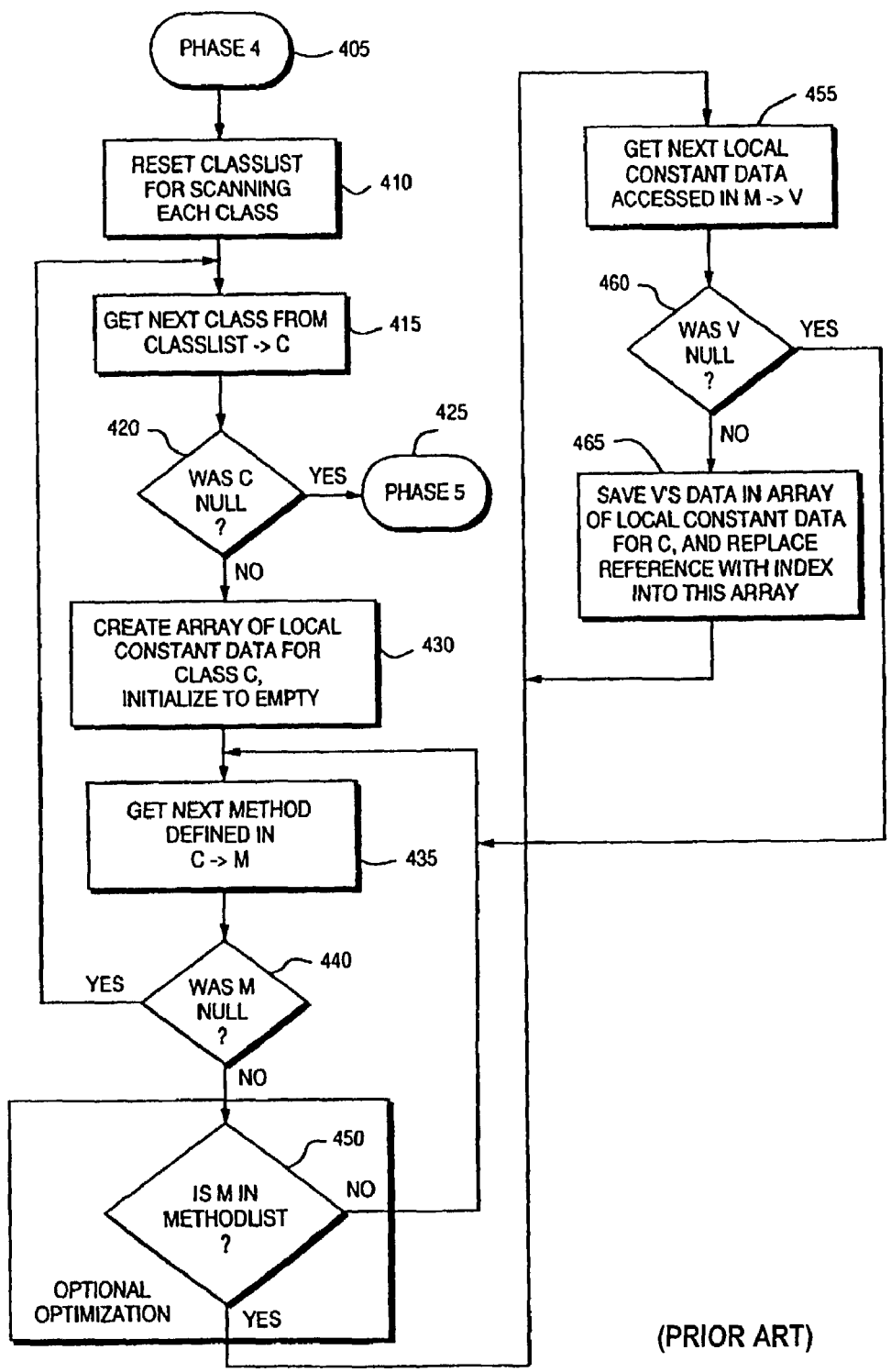
FIG. 8 is a flow diagram illustrating a fourth phase of a method of concentrating software in accordance with the invention described in U.S. Pat. No. 6,163,780.
Figure 9:
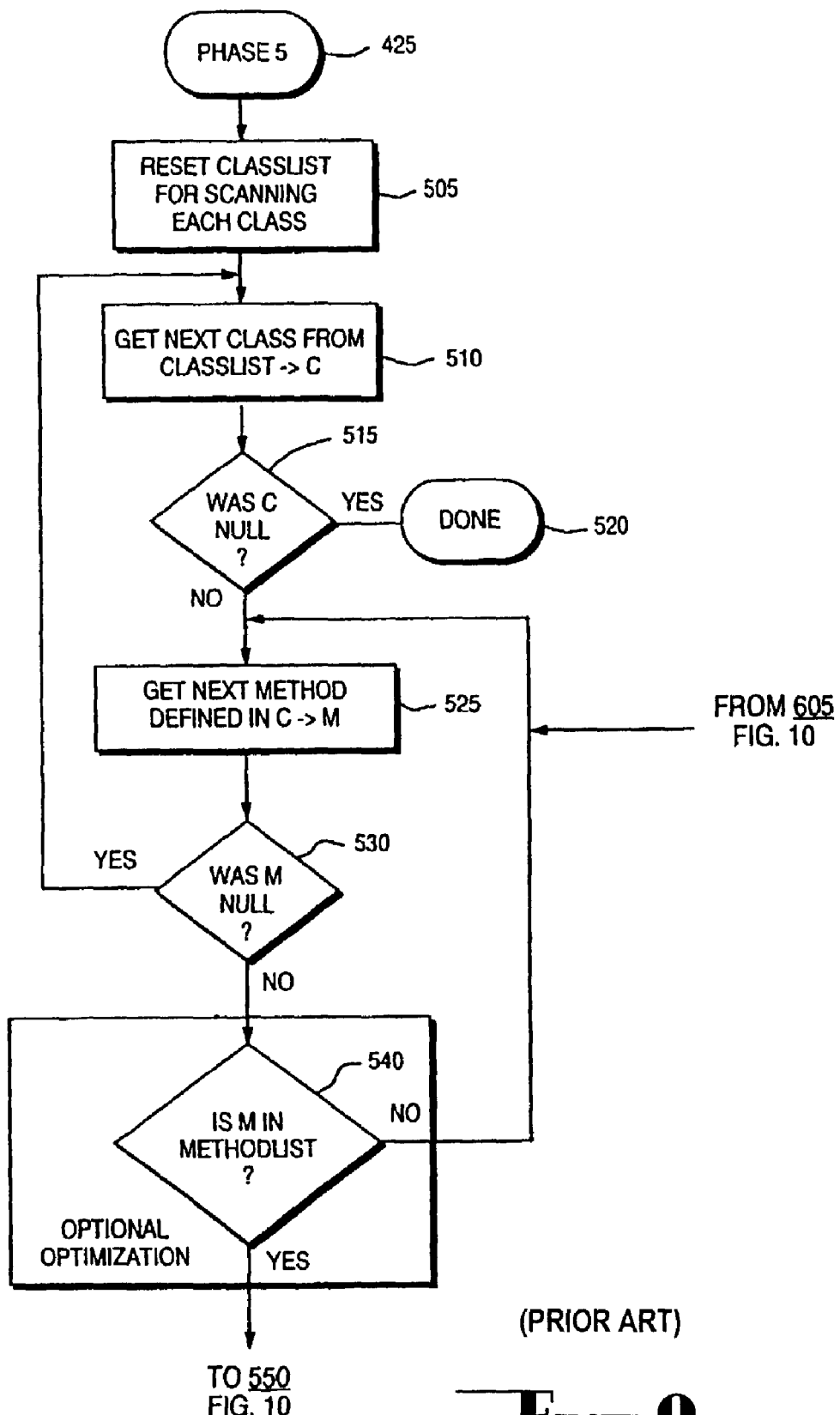
FIG. 9 is a flow diagram illustrating a first portion of a fifth phase of a method of concentrating software in accordance with the invention described in U.S. Pat. No. 6,163,780.
Figure 10:
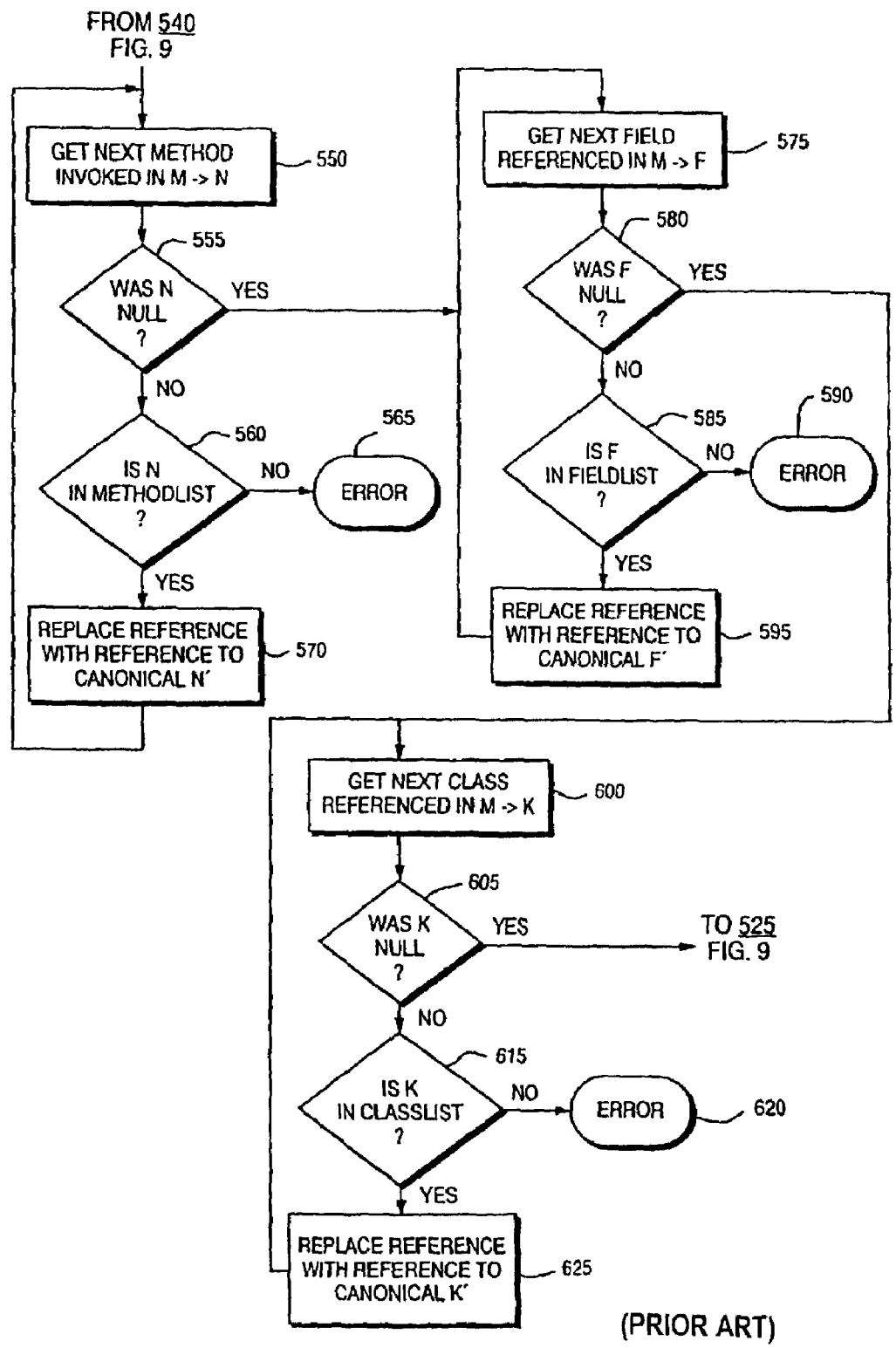
FIG. 10 is a flow diagram illustrating a second portion of a fifth phase of a method of concentrating software in accordance with the invention described in U.S. Pat. No. 6,163,780.

The data processing system 40 also executes and preferably stores concentrating software 95 for concentrating the upgrade bytecode 74 in accordance with the present invention. The concentrating software 95 is illustrated in FIG. 2 as being stored in non-volatile memory 70. However, it should be understood that it can be stored in other ways such as in RAM 65 or on removable media inserted in the removable media drive 90. Exemplary removable media for storing the concentrating software 95 (which may be in any form, such as source code, compiled or binary versions) are illustrated in FIGS. 3A, 3B and 3C as floppy disks, magnetic tape and optical disks, respectively. In the preferred embodiment, the concentrating software 95 is read into RAM 65 when it is to be executed. To concentrate the upgrade bytecode 74, the concentrating software 95 is executed.

To provide a full understanding of the present invention, U.S. Pat. No. 6,163,780 is incorporated herein by reference. However, while the process described in that disclosure is almost identical to the process that forms part of the present invention, in the present invention the resulting canonical lists (referred to in this specification as "OriginalClassList", "OriginalMethodList" and "OriginalFieldList" respectively) contain a field for recording the unique identifier of the item the subject of the canonical list and a field for identifying the offset of the class, method or field, as appropriate, from the start of the original bytecode 72 (the "Offset Field"). To illustrate, when the original bytecode 72 is loaded into RAM 65 the first memory address taken up by the original bytecode 72 is recorded. The value of the Offset Field for each entry in the OriginalClassList, OriginalMethodList and OriginalFieldList is then calculated by determining the distance, in memory address terms, between the first memory address taken up by the original bytecode 72 and the first memory address taken up by the bytecode that forms the basis of the class, method or field, as appropriate.

The process described in U.S. Pat. No. 6,63,780 is shown schematically in FIGS. 4 to 10.

Once concentrated, ideally, the OriginalClassList, OriginalMethodList and OriginalFieldList consists of abstract or minimal canonical lists of classes, methods and fields. In this situation, the abstract or minimal lists are kept separate from the lists stored in a virtual table 92 (described in more detail below and first shown in FIG. 18). In alternative arrangements, the OriginalClassList, OriginalMethodList and OriginalFieldList may be stored in their complete form as a record in the virtual table 92 or split such that the set of abstract or minimal canonical lists of classes, methods and fields is kept separate from the virtual table 92 while the remainder is stored as a record in the virtual table 92. In either case the original bytecode is adapted to refer to the abstract or minimal canonical list (if any) as well as the virtual table 92.

Once the original bytecode 72 has been processed in the manner described above, an upgrade can then be made without the need for reconcentration of the original bytecode 72 by adopting the following process.

Figure 11:
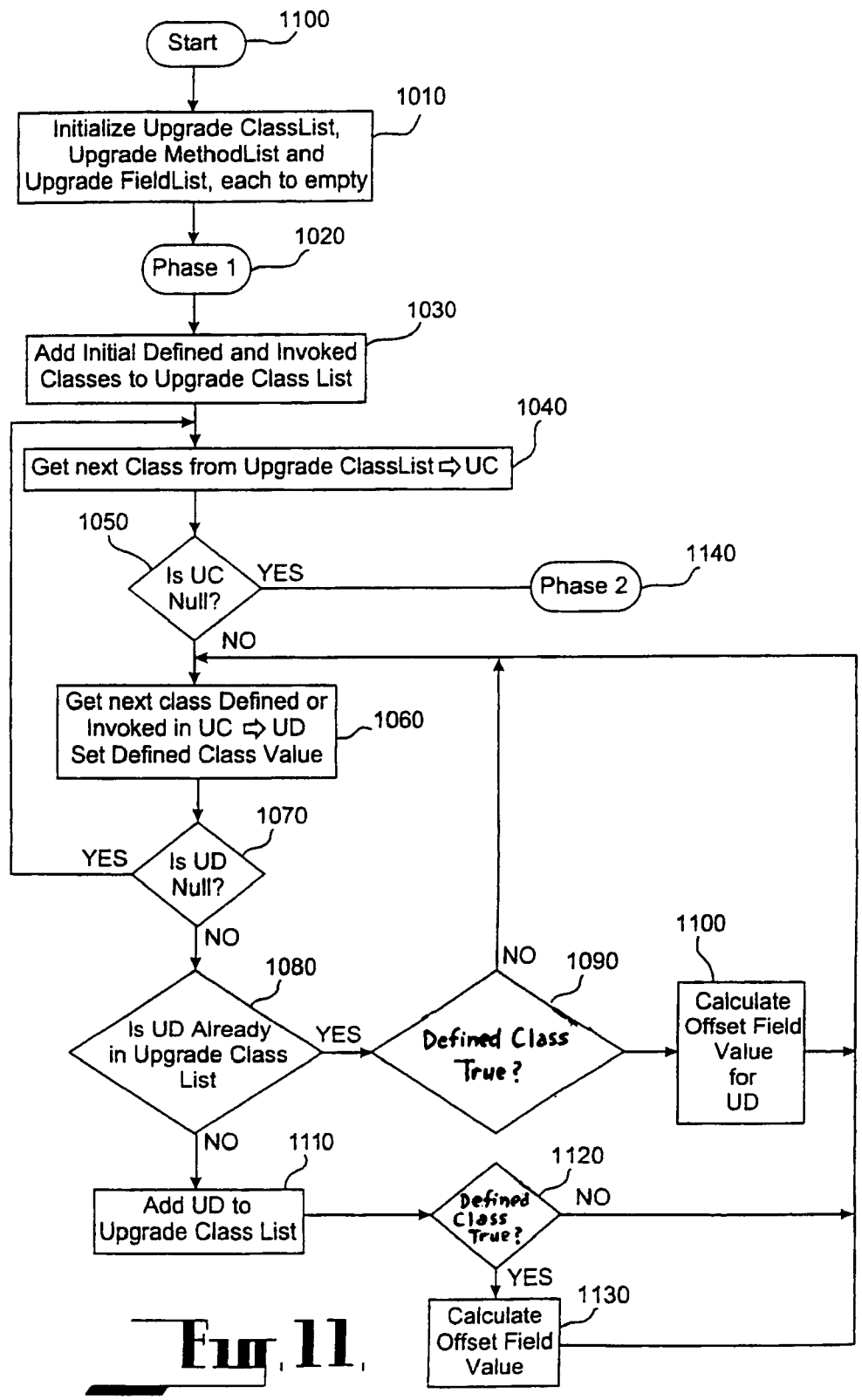
FIG. 11 is a flow diagram illustrating a first phase of a method of dynamically upgrading concentrated executable computer software code in accordance with the present invention.

As shown in FIG. 11, the upgrade process commences with an initialisation procedure 1000. The initialisation process 1000 consists of a single step 1010 where three lists corresponding respectively to classes, methods and fields are initialised to some default state, such as empty. The lists in the illustrated embodiment are referred to hereafter as "UpgradeClassList", "UpgradeMethodList" and "UpgradeFieldList". Note that the lists are used as exemplary data structures, but any suitable data structure may be used.

A pointer to the start of each list is then created and initialised. These pointers will be referred to hereafter as "ClassListStart", "MethodListStart" and "FieldListStart" as appropriate. At the same time, additional pointers to the end of each list are created and initialised. These pointers will be referred to hereafter as "ClassListEnd", "MethodListEnd" and "FieldListEnd" as appropriate.

The process then continues to Phase 1 as indicated by step 1020.

In Phase 1, 1020 the upgrade bytecode 74 is scanned and the UpgradeClassList populated. This commences with step 1030, when the upgrade bytecode 74 is scanned for any class definitions or invocations. When a class definition or invocation is found, a check is made to determine whether the class has already been recorded in the UpgradeClassList. If it is determined that the class has not already been recorded in the UpgradeClassList, the name of the class defined or invoked is inserted, into the UpgradeClassList and ClassListEnd updated to point to the newly inserted class. If it is determined that the class has already been recorded in the UpgradeClassList, the scan for the next class definition or invocation continues.

In this manner, the UpgradeClassList ultimately generated contains the names of each of the classes that are defined or invoked within the upgrade bytecode 74 and ClassListEnd points to the last class inserted into the UpgradeClassList.

Any procedure for scanning the upgrade bytecode 74 may be used.

At step 1040, a first class is retrieved from the UpgradeClassList and a variable UC is filled with the name corresponding to that first class. In successive iterations of step 1040, variable UC is assigned the name of successive classes listed in the UpgradeClassList and each class is processed in accordance with the steps that follow.

Variable UC thereby indicates the class that is currently being processed, and such class is referred to herein as "Class UC".

Upon reaching the end of the UpgradeClassList, the variable UC is assigned an "end-of-list" value (e.g., a null value) indicating that there are no more classes in the UpgradeClassList to be processed. If it is determined, at step 1050, that variable UC has been assigned a null value, processing continues to the next phase, Phase 2, 1140. If UC has not been assigned a null value, thereby indicating that there are more classes to be processed, operation continues to step 1060.

At step 1060, Class UC is scanned to determine whether any other classes are defined or invoked therein. The distinction between a class definition and a class invocation is determined with reference to its context. To elaborate, a class definition will be prefaced by the reserved word or phrase necessary to define the class. In the JAVA programming language, for example, the reserved word used to indicate that a new class has been defined is "class".

Upon identification of a class definition or invocation, the name of the class so defined or invoked is assigned to a variable UD. Further, if the identified class is a newly defined class, this fact is recorded by setting boolean variable DefinedClass to true (this variable initialised to false at first instance). If the scan of Class UC does not reveal any classes that are defined or invoked within Class UC, variable UD is assigned a null value.

In successive iterations of step 1060, variable UD is assigned the name of the next class defined or invoked within Class UC, if any. If Class UC does not reference any further classes defined or invoked within the upgrade bytecode 74, variable UD is assigned a null value.

Processing then continues at step 1070 where the value assigned to variable UD is analysed. If variable UD has been assigned a null value, processing returns to step 1040 where the next class identified in the UpgradeClassList is processed. If variable UD has been assigned any value other than a null value, processing moves to step 1080.

Step 1080 compares the value of variable UD, ie. the name of the class defined or invoked in the upgrade bytecode 74, against the names of classes already included in the UpgradeClassList. If this comparison determines that the class name, as recorded by variable UD, has already been included in the UpgradeClassList, processing continues to step 1090. If the comparison determines that the class name, as recorded by variable UD, has not already been included in the UpgradeClassList, processing continues to step 1110.

At step 1090, the value assigned to variable DefinedClass is analysed. If variable DefinedClass has been assigned a true value, processing continues to step 1100. If variable DefinedClass has been assigned a false value, processing returns to step 1060 where the next class identified in UpgradeClassList is processed.

Step 1100 commences by searching the UpgradeClassList for the record corresponding to the class recorded by variable UD. Once found, the Offset Field value for this record is set by determining the distance, in memory address terms, between the first memory address taken up by the upgrade bytecode 74 and the first memory address taken up by the bytecode that defines the class recorded by variable UD. Variable DefinedClass is then reset to a false value. Processing then returns to step 1060.

At step 1110, the class name, as recorded by variable UD, is added to the UpgradeClassList at the position immediately after the class pointed to by ClassListEnd. At step 1120, the value assigned to variable DefinedClass is analysed. If variable DefinedClass has been assigned a true value, processing continues to step 1130. If variable DefinedClass has been assigned a false value, processing returns to step 1060 where the next class identified in UpgradeClassList is processed.

At step 1130, the Offset Field value for the class recorded by variable UD is calculated. This is achieved by determining the distance, in memory address terms, between the first memory address taken up by the upgrade bytecode 74 and the first memory address taken up by the bytecode that defines the class recorded by variable UD.

Processing then returns to step 1060.

Figure 12:
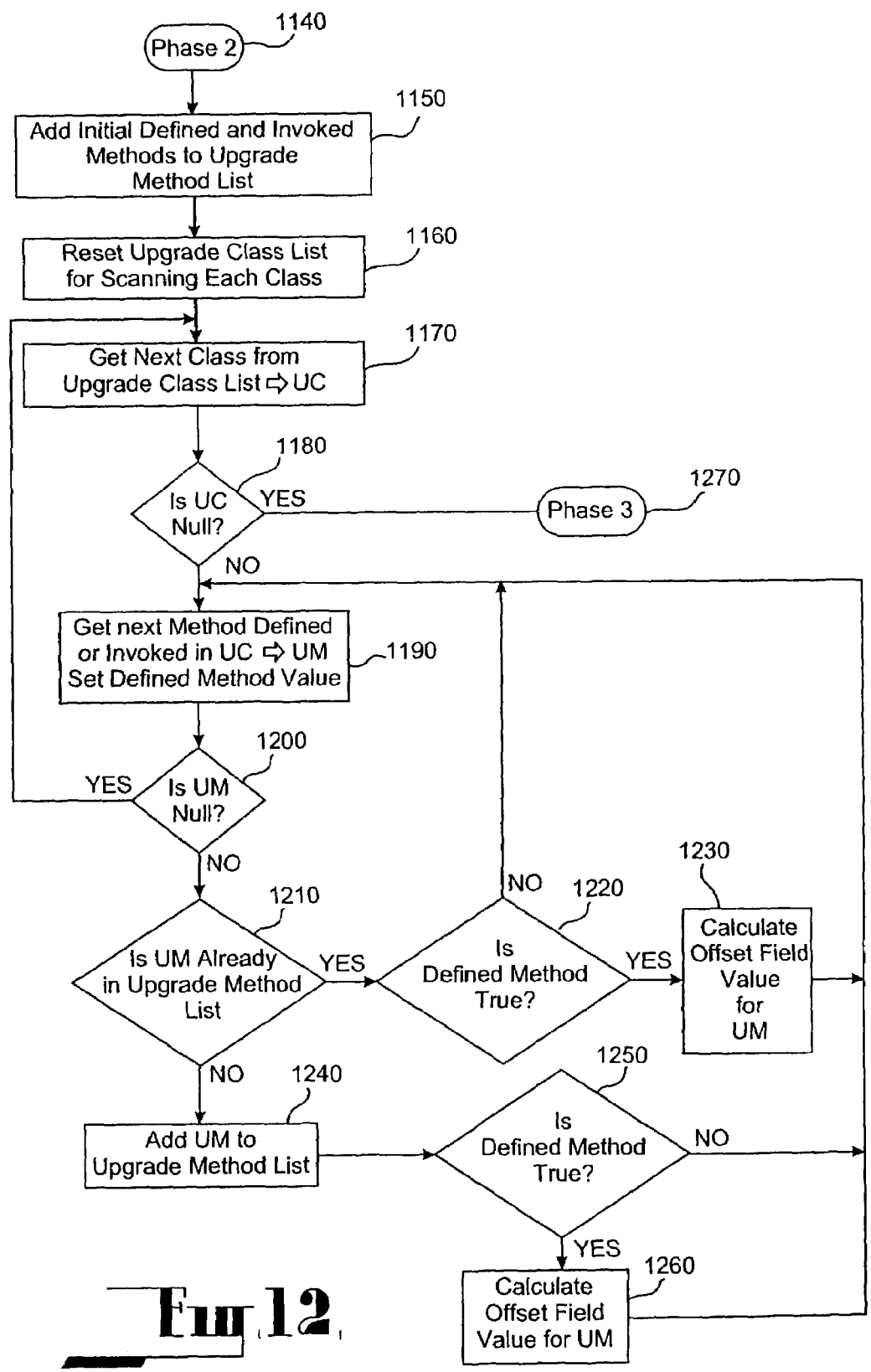
FIG. 12 is a flow diagram illustrating a second phase of a method of dynamically upgrading concentrated executable computer software code in accordance with the present invention.

FIG. 12 illustrates the steps involved in Phase 2, 1140. Phase 2, 1140 involves scanning the upgrade bytecode 74 and populating the UpgradeMethodList with initially defined or identified methods. This phase commences with step 1150, where the upgrade bytecode 74 is scanned for any method definitions or invocations.

When a method definition or invocation is found, a check is made to determine whether the method has already been recorded in the UpgradeMethodList. If it is determined that the method has not already been recorded in the UpgradeMethodList, the name of the method defined or invoked is inserted, into the UpgradeMethodList, and MethodListEnd updated to point to the newly inserted method. If it is determined that the method has already been recorded in the UpgradeMethodList, the scan for the next method definition or invocation continues.

In this manner, the UpgradeMethodList ultimately generated contains the names of each of the methods that are defined or invoked within the upgrade bytecode 74 and MethodListEnd points to the last method inserted into the UpgradeMethodList.

Any procedure for scanning the upgrade bytecode 74 may be used.

Processing then continues at step 1160 where the UpgradeClassList is reset to its start, i.e., the class pointed to be ClassListStart. The first class in the UpgradeClassList is then retrieved, at step 1170, and variable UC assigned the name corresponding to that first class.

In successive iterations of step 1170, variable UC is assigned the name of successive classes listed in the UpgradeClassList and each class is processed in accordance with the steps that follow. Variable UC thereby indicates the class that is currently being processed, and, as above, such class is referred to as "Class UC".

Upon reaching the end of the UpgradeClassList, the variable UC is assigned an "end-of-list" value (e.g., a null value) indicating that there are no more classes in the UpgradeClassList to be processed. If it is determined at step 1180, that variable UC has been assigned a null value, processing continues to Phase 3, 1270. If UC has not been assigned a null value, thereby indicating that there are more classes to be processed, operation continues to step 1190.

In step 1190, Class UC is scanned to determine whether any other methods are defined or invoked therein. The distinction between a method definition and a method invocation is determined with reference to its context. To elaborate, a method definition will be prefaced by the reserved word or phrase necessary to define the method. In the JAVA programming language, for example, the reserved word used to indicate that a new method has been defined is "method".

Upon identification of a method definition or invocation, the name of the method so defined or invoked is assigned to a variable UM. Further, if the identified method is a newly defined method, this fact is recorded by setting boolean variable DefinedMethod to true (this variable initialised to false at first instance). If the scan of Class UC does not reveal any methods that are defined or invoked within Class UC, variable UM is assigned a null value.

In successive iterations of step 1190, variable UM is assigned the name of the next method defined or invoked within Class UC, if any. If Class UC does not reference any further methods defined or invoked within the upgrade bytecode 74, variable UM is assigned a null value.

Processing then continues at step 1200 where the value assigned to variable UM is analysed. If variable UM has been assigned a null value, processing returns to step 1190 where the next class identified in the UpgradeClassList is processed. If variable UM has been assigned any value other than a null value, processing moves to step 1210.

Step 1210 compares the value of variable UM, ie. the name of the method defined or invoked in the upgrade bytecode 74, against the names of methods already included in the UpgradeMethodList. If this comparison determines that the method name, as recorded by variable UM, has already been included in the UpgradeMethodList, processing continues to step 1220. If the comparison determines that the method name, as recorded by variable UM, has not already been included in the UpgradeMethodList, processing continues to step 1240.

At step 1220, the value assigned to variable DefinedMethod is analysed. If variable DefinedMethod has been assigned a true value, processing continues to step 1230. If variable DefinedMethod has been assigned a false value, processing returns to step 1190 where the next class identified in UpgradeClassList is processed.

Step 1230 commences by searching the UpgradeMethodList for the record corresponding to the method recorded by variable UM. Once found, the Offset Field value for this record is set by determining the distance, in memory address terms, between the first memory address taken up by the upgrade bytecode 74 and the first memory address taken up by the bytecode that defines the method recorded by variable UM.

Variable DefinedMethod is then reset to a false value. Processing then returns to step 1190.

At step 1240, the method name, as recorded by variable UM, is added to the UpgradeMethodList at the position immediately after the method pointed to by MethodListEnd.

At step 1250, the value assigned to variable DefinedMethod is analysed.

If variable DefinedMethod has been assigned a true value, processing continues to step 1260. If variable DefinedMethod has been assigned a false value, processing returns to step 1190 where the next class identified in UpgradeClassList is processed.

At step 1260, the Offset Field value for the method recorded by variable UM is calculated. This is achieved by determining the distance, in memory address terms, between the first memory address taken up by the upgrade bytecode 74 and the first memory address taken up by the bytecode that defines the method recorded by variable UM.

Processing then returns to step 1190.

Once all method definitions have been found, as indicated by variable UC having been assigned a null value when analysed at step 1170, processing continues to Phase 3, 1270, to facilitate population of the UpgradeFieldList.

Figure 13:
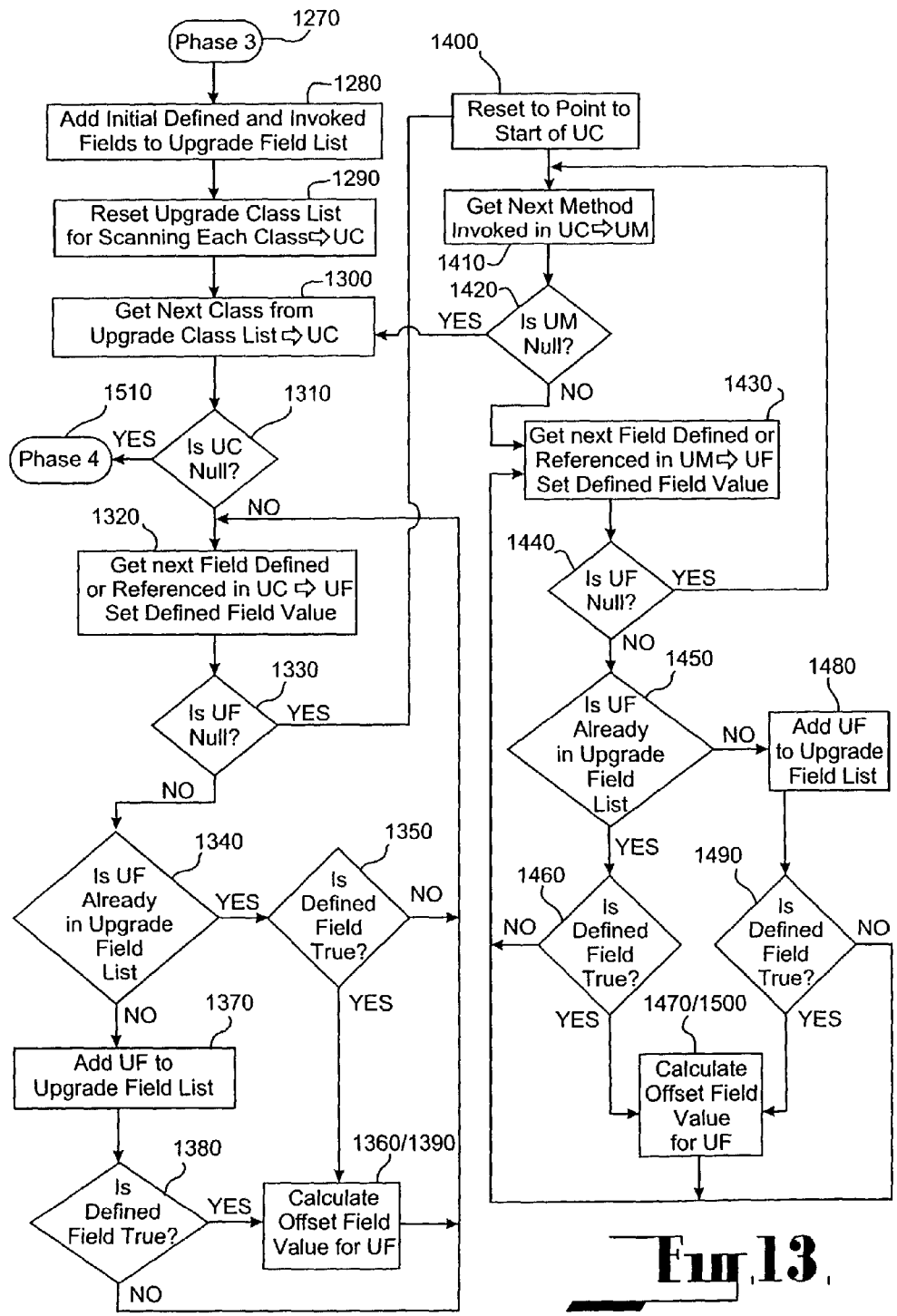
FIG. 13 is a flow diagram illustrating a third phase of a method of dynamically upgrading concentrated executable computer software code in accordance with the present invention.

FIG. 13. Illustrates the steps involved in Phase 3, 1270. Phase 3, 1270, involves scanning the upgrade bytecode 74 and populating the UpgradeFieldList with initially identified fields (typically public fields). This phase commences with step 1280, where the upgrade bytecode 74 is scanned for any reserved words indicating that a new field has been defined or referenced.

As described above, any series of processing steps to scan the upgrade bytecode 74 may be employed.

The name of the newly defined field is then inserted into the UpgradeFieldList at the position immediately after the field pointed to be FieldListEnd and FieldListEnd updated to point to the newly inserted field. In this manner, the UpgradeFieldList ultimately generated contains the name of each of the fields that are defined or referenced within the upgrade bytecode 74. Processing then continues at step 1290.

At step 1290, UpgradeClassList is reset to its start, i.e., the class pointed to be ClassListStart. The first class in the UpgradeClassList is then retrieved, at step 1300, and variable UC assigned the name corresponding to that first class.

In successive iterations of step 1300, variable UC is assigned the name of successive classes listed in the UpgradeClassList and each class is processed in accordance with the steps that follow. Variable UC thereby indicates the class that is currently being processed, and, as above, such class is referred to as "Class UC".

Upon reaching the end of the UpgradeClassList, the variable UC is assigned an "end-of-list" value (e.g., a null value) indicating that there are no more classes in the UpgradeClassList to be processed. If it is determined at step 1310, that variable UC has been assigned a null value, processing continues to Phase 4, 1510. If UC has been assigned any value other than a null value, thereby indicating that there are more classes to be processed, operation continues to step 1320.

In step 1320, Class UC is scanned to determine whether any other fields are defined or referenced therein. The distinction between a field definition and a field reference is determined with reference to its context. To elaborate, a field definition will be prefaced by the reserved word or phrase necessary to define the field. Such reserve words or phrases may vary according to the programming language of the upgrade bytecode 74.

Upon identification of a field definition or reference, the name of the field so defined or referenced is assigned to a variable UF. Further, if the identified field is a newly defined, this fact is recorded by setting boolean variable DefinedField to true (this variable initialised to false at first instance). If the scan of Class UC does not reveal any fields that are defined or referenced within Class UC, variable UF is assigned a null value.

In successive iterations of step 1320, variable UF is assigned the name of the next field defined or referenced within Class UC, if any. If Class UC does not reference any further fields defined or referenced within the upgrade bytecode 74, variable UF is assigned a null value.

Processing then continues at step 1330 where the value assigned to variable UF is analysed. If variable UF has been assigned a null value, processing continues at step 1400. If variable UF has been assigned any value other than a null value, processing moves to step 1340.

Step 1340 compares the value of variable UF, i.e., the name of the field defined or referenced in the upgrade bytecode 74, against the names of fields already included in the UpgradeFieldList. If this comparison determines that the field name, as recorded by variable UF, has already been included in the UpgradeFieldList, processing continues to step 1350. If the comparison determines that the field name, as recorded by variable UF, has not already been included in the UpgradeFieldList, processing continues to step 1370.

At step 1350, the value assigned to variable DefinedField is analysed. If variable DefinedField has been assigned a true value, processing continues to step 1360. If variable DefinedField has been assigned a false value, processing returns to step 1320 where the next field identified in UpgradeFieldList is processed.

Step 1360 commences by searching the UpgradeFieldList for the record corresponding to the field recorded by variable UF. Once found, the Offset Field value for this field is set by determining the distance, in memory address terms, between the first memory address taken up by the upgrade bytecode 74 and the first memory address taken up by the bytecode that defines the field recorded by variable UF. Variable DefinedField is then reset to a false value. Processing then returns to step 1320.

At step 1370, the field name, as recorded by variable UF, is added to the UpgradeFieldList at the position immediately after the field pointed to by FieldListEnd. At step 1380, the value assigned to variable DefinedField is analysed. If variable DefinedField has been assigned a true value, processing continues to step 1390. If variable DefinedField has been assigned a false value, processing returns to step 1320 where the next class identified in UpgradeClassList is processed.

At step 1390, the Offset Field value for the field recorded by variable UF is calculated. This is achieved by determining the distance, in memory address terms, between the first memory address taken up by the upgrade bytecode 74 and the first memory address taken up by the bytecode that defines the field recorded by variable UF.

Processing then returns to step 1320.

This process repeats until all fields defined or referenced in Class UC have been identified.

At step 1400, Class UC is rest to its start. A scan is then commenced, at step 1410, of Class UC for any method invocations. When a method invocation is found, the name of the method invoked is assigned to variable UM. If Class UC does not include any method invocations, variable UM is assigned an "end-of-list" value, such as a null value.

In successive iterations of step 1410, variable UM is assigned the name of successive method invocations in Class UC and each method is processed in accordance with the steps that follow. Variable UM thereby indicates the method that is currently being processed, and such method will be referred to herein as "Method UM".

At step 1420, the value of variable UM is analysed to determine whether it has been assigned a null value. If variable UM has been assigned a null value, processing returns to step 1300 where the next class in the UpgradeClassList is processed. If variable UM has been assigned any value other than a null value, processing continues to step 1430.

At step 1430, method UM is scanned to determine the next defined or referenced field. The first of any such fields referenced is assigned to a variable UF. If the scan of Method UM does not reveal any field references, or any further field references, variable UF is assigned a null value.

In successive iterations of step 1430, variable UF is assigned the name of the next field defined or referenced within Method UM. If Method UM does not refer to any further fields, variable UF is assigned a null value.

Processing then continues at step 1440 where the value of variable UF is analysed. If variable UF is assigned a null value, processing continues at step 1430 where the next method defined or referenced in Class UC is identified. If variable UF is assigned any value other than a null value, processing moves to step 1450.

Step 1450 compares the value of variable UF, ie. the name of the field defined or referenced in the upgrade bytecode 74, against the names of fields already included in the UpgradeFieldList. If this comparison determines that the field name, as recorded by variable UF, has already been included in the UpgradeFieldList, processing continues to step 1460. If the comparison determines that the field name, as recorded by variable UF, has not already been included in the UpgradeFieldList, processing continues to step 1480.

At step 1460, the value assigned to variable DefinedField is analysed. If variable DefinedField has been assigned a true value, processing continues to step 1480. If variable DefinedField has been assigned a false value, processing returns to step 1430 where the next method identified in UpgradeMethodList is processed.

Step 1470 commences by searching the UpgradeFieldList for the record corresponding to the field recorded by variable UF. Once found, the Offset Field value for this field is set by determining the distance, in memory address terms, between the first memory address taken up by the upgrade bytecode 74 and the first memory address taken up by the bytecode that defines the field recorded by variable UF. Variable DefinedField is then reset to a false value. Processing then returns to step 1430.

At step 1480, the field name, as recorded by variable UF, is added to the UpgradeFieldList at the position immediately after the field pointed to by FieldListEnd. At step 1490, the value assigned to variable DefinedField is analysed. If variable DefinedField has been assigned a true value, processing continues to step 1500. If variable DefinedField has been assigned a false value, processing returns to step 1430 where the next method identified in UpgradeMethodList is processed.

At step 1500, the Offset Field value for the field recorded by variable UF is calculated. This is achieved by determining the distance, in memory address terms, between the first memory address taken up by the upgrade bytecode 74 and the first memory address taken up by the bytecode that defines the field recorded by variable UF.

Processing then returns to step 1430.

This process repeats until all methods invoked in Class UC have been traversed to identify any field referenced and all field references in each such method, i.e., Method UM, have been identified and processed.

Figure 14:
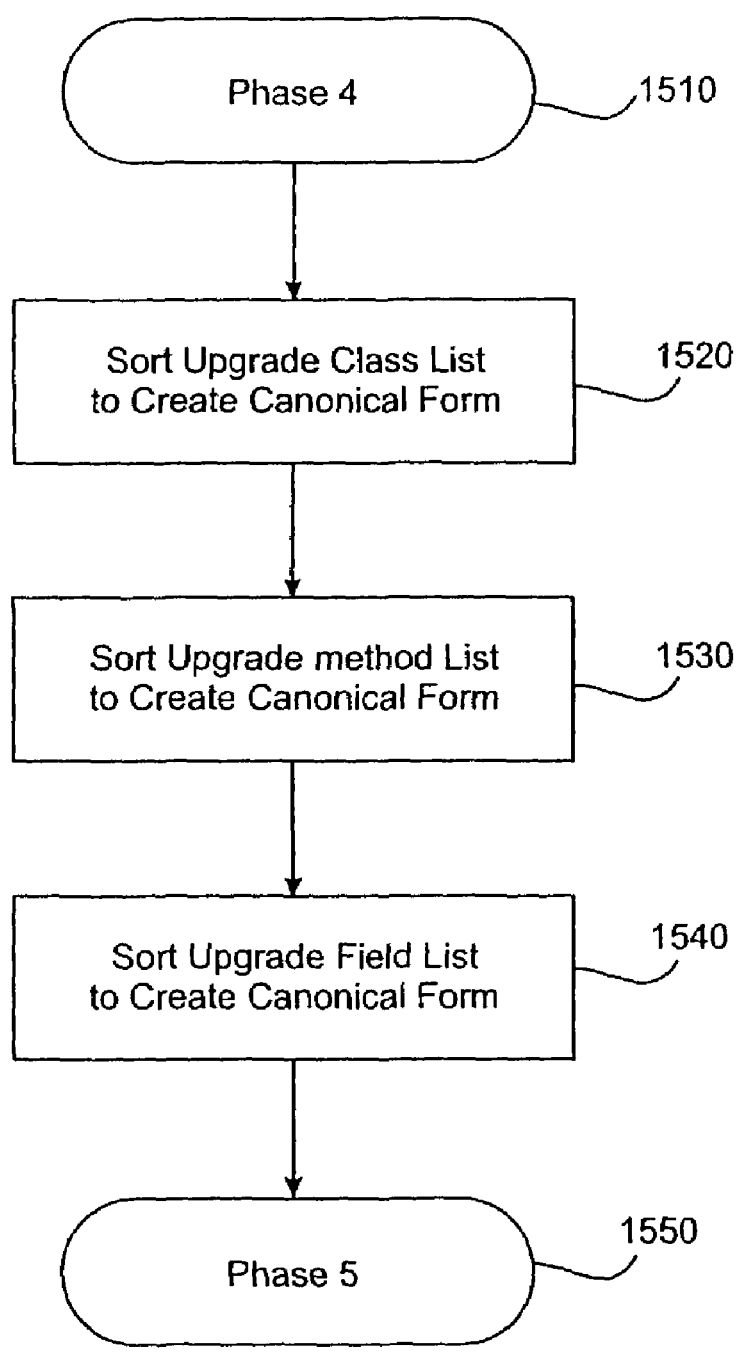
FIG. 14 is a flow diagram illustrating a fourth phase of a method of dynamically upgrading concentrated executable computer software code in accordance with the present invention.
Figure 15:
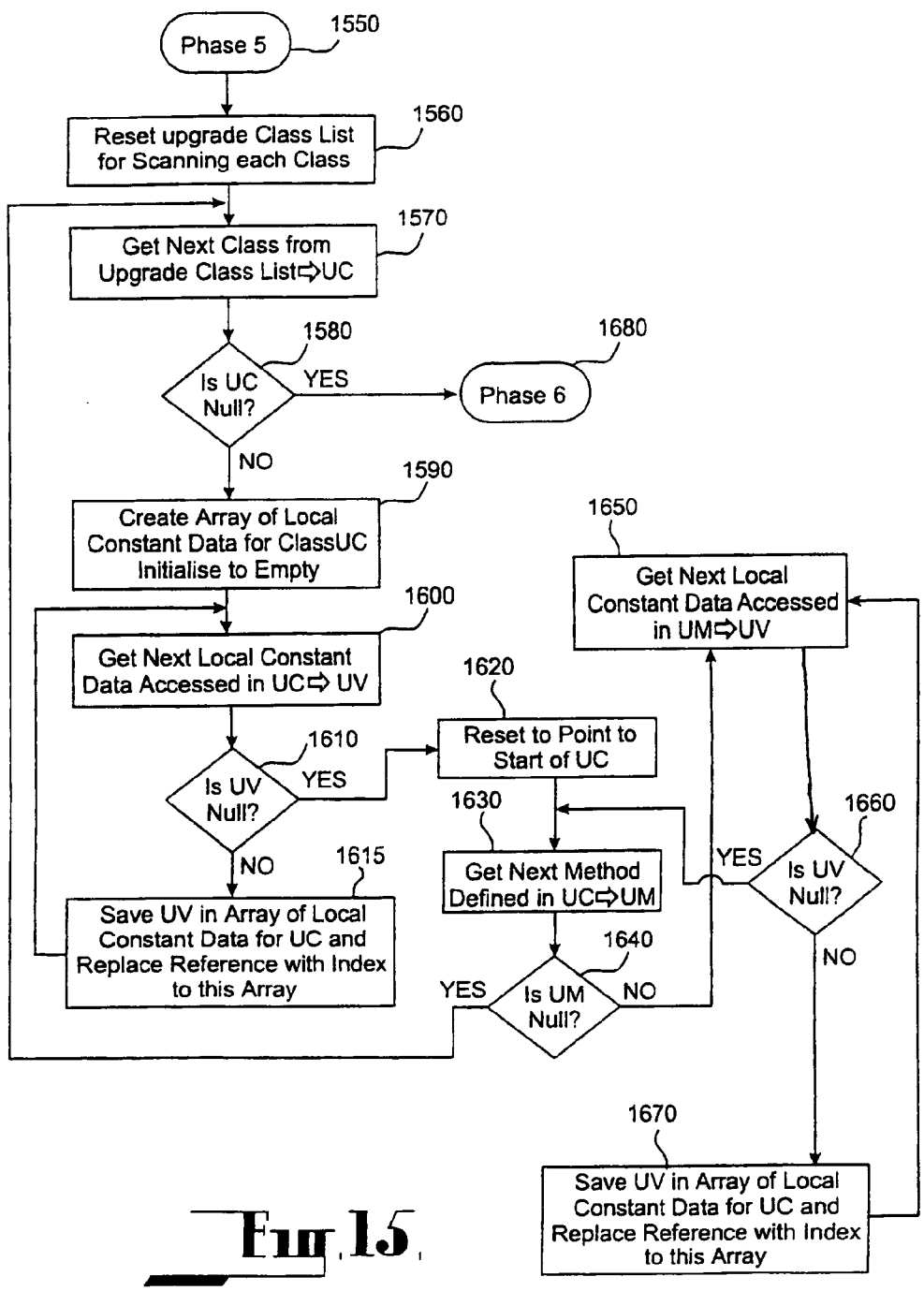
FIG. 15 is a flow diagram illustrating a fifth phase of a method of dynamically upgrading concentrated executable computer software code in accordance with the present invention.

FIG. 14 shows the steps that form Phase 4, 1510. Phase 4, commences by sorting the UpgradeClassList to create a canonical form, as illustrated by step 1520. Steps 1530 and 1540 are then processed to sort the UpgradeMethodList and UpgradeFieldList, respectively, to create canonical forms of each. Processing then proceeds to Phase 5, 1550 (see FIG. 15).

Phase 5, 1550 commences at step 1560 by resetting UpgradeClassList such that reference is made to the first class included therein, i.e., to the class pointed to by ClassListStart. The first class in the UpgradeClassList is then retrieved, at step 1570, and the variable UC filled with the name corresponding to that first class.

In successive iterations of step 1570, variable UC is assigned the name of successive classes listed in the UpgradeClassList and each class is processed in accordance with the steps that follow. Variable UC thereby indicates the class that is currently being processed, and, as above, such class will be referred to as "Class UC". Upon reaching the end of the UpgradeClassList, the variable UC is assigned an "end-of-list" value (e.g., a null value) indicating that there are no more classes in the UpgradeClassList to be processed. If it is determined, at step 1580, that variable UC has been assigned a null value, processing continues to Phase 6, 1680. If UC has been assigned any value other than a null value, thereby indicating that there are more classes to be processed, operation continues to step 1590.

Step 1590 comprises two actions. Firstly, an array of local constant data for Class UC is created. Secondly, the array is initialised to some default state such as empty. Subsequent iterations of step 1590 see a new array of local constant data being created and initialised, each new array being associated with the class then being processed, i.e., Class UC.

Processing then continues to step 1600. At step 1600, Class UC is scanned for a reference to a local constant data. When, and if, so found the name of the local constant data so referenced is assigned to variable UV. If Class UC contains no references to local constant data, variable UV is assigned a null value.

In successive iterations of step 1600, variable UV is assigned the name of the next local constant data referenced within Class UC. If Class UC does not refer to any further local constant data, variable UV is assigned a null value.

Step 1610 involves the analysis of the value assigned to variable UV. If variable UV has been assigned a null value processing continues at step 1610. If variable UV has been assigned any value other than a null value, processing continues to step 1620.

At step 1610, the value assigned to variable UV is saved in the array of local constant data created at step 1590. The reference in Class UC to the local constant data is then replaced with the value representing the position in the array of local constant data where the value assigned to variable UV has been saved. Processing then returns to step 1590.

Once all local constant data references in Class UC have been identified and saved in the array of local constant data, processing moves to step 1620.

At step 1620, Class UC is again reset to its start. A scan is then commenced, at step 1630, of Class UC for any method invocations. When a method invocation is found, the name of the method invoked is assigned to variable UM. If Class UC does not include any method invocations, variable UM is assigned an "end-of-list" value, such as a null value.

In successive iterations of step 1630, variable UM is assigned the name of successive method invocations in Class UC and each method is processed in accordance with the steps that follow. Variable UM thereby indicates the method that is currently being processed, and, as discussed above, such methods will be referred to as "Method UM".

At step 1640, the value of variable UM is analysed to determine whether it has been assigned a null value. If variable UM has been assigned a null value, processing returns to step 1570 where the next class in the UpgradeClassList is processed. If variable UM has been assigned any value other than a null value processing continues to step 1650.

Step 1650 sees method UM scanned to determine the next local constant data reference. The first of any such references is assigned to a variable UV. If the scan of Method UM does not reveal any local constant data references, or any further local constant data references, variable UV is assigned a null value.

In successive iterations of step 1650, variable UV is assigned the name of the next local constant data referenced within Method UM. If Method UM does not refer to any further local constant data, variable UV is assigned a null value.

Processing then continues at step 1660 where the value of variable UV is analysed. If variable UV is assigned a null value, processing returns to step 1630 where the next method invoked in Class UC is identified. If variable UV is assigned any value other than a null value, processing moves to step 1670.

At step 1670, the value assigned to variable UV is saved in the array of local constant data created at step 1580. The reference in Class UC to the local constant data where the value assigned to variable UV has been saved. Processing then returns to step 1650.

This process repeats until all methods invoked in Class UC have been traversed to identify any local constant data references and all local constant data references in each such method, i.e., Method UM, have been identified and saved in the array of local constant data for Class UC.

Figure 16:
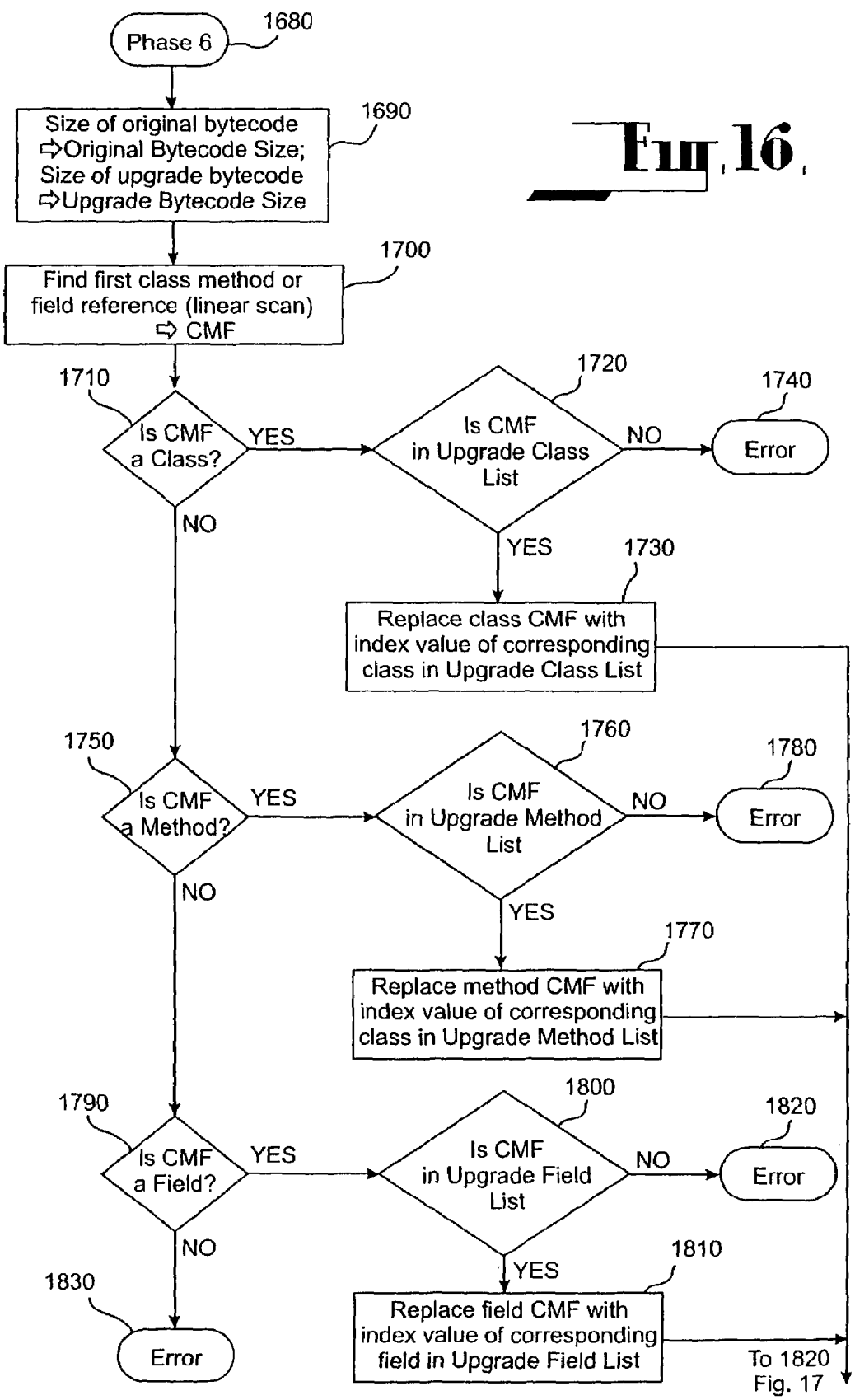
FIG. 16 is a flow diagram illustrating a first part of a sixth phase of a method of dynamically upgrading concentrated executable computer software code in accordance with the present invention
Figure 18A:
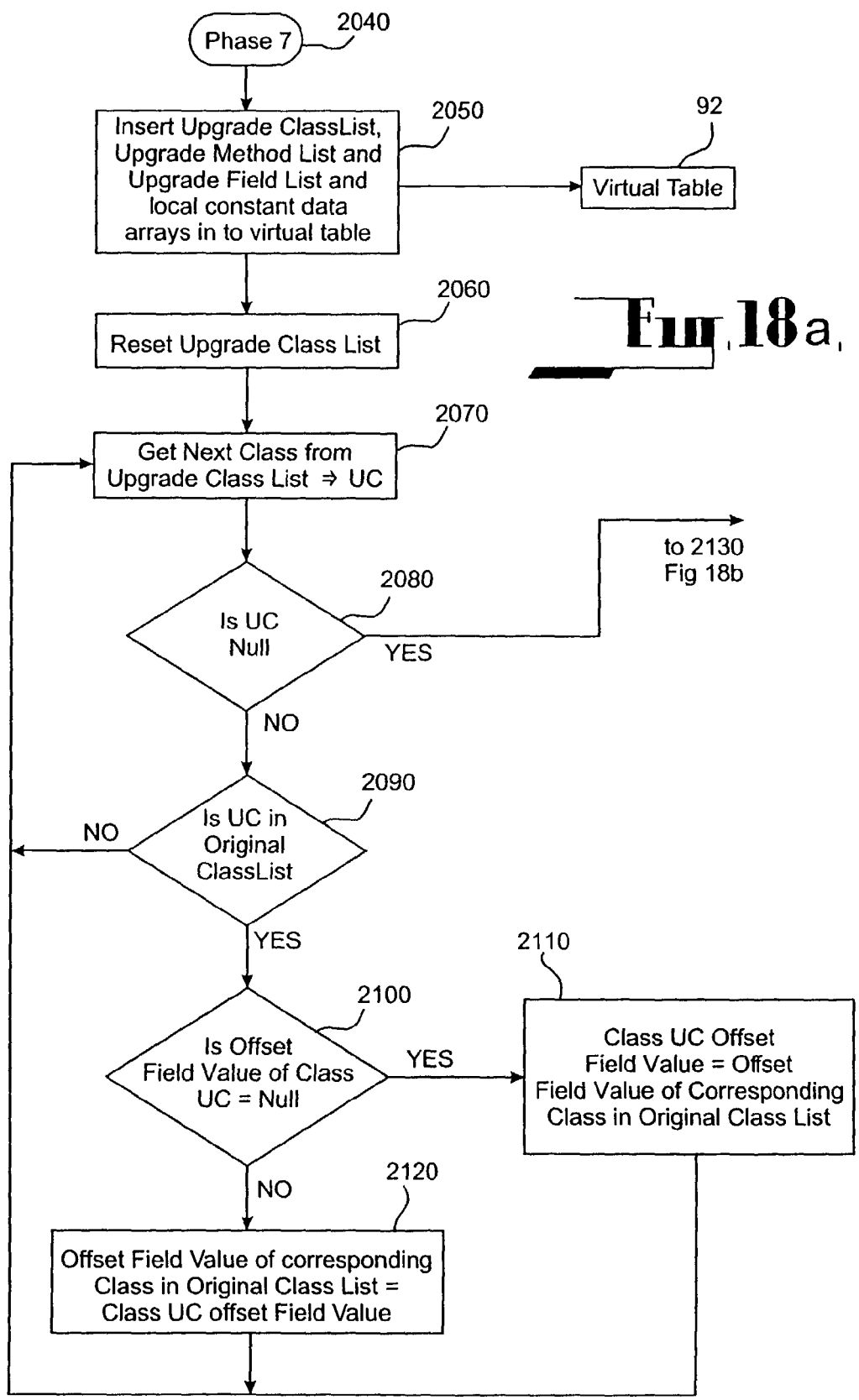
Figure 18B:
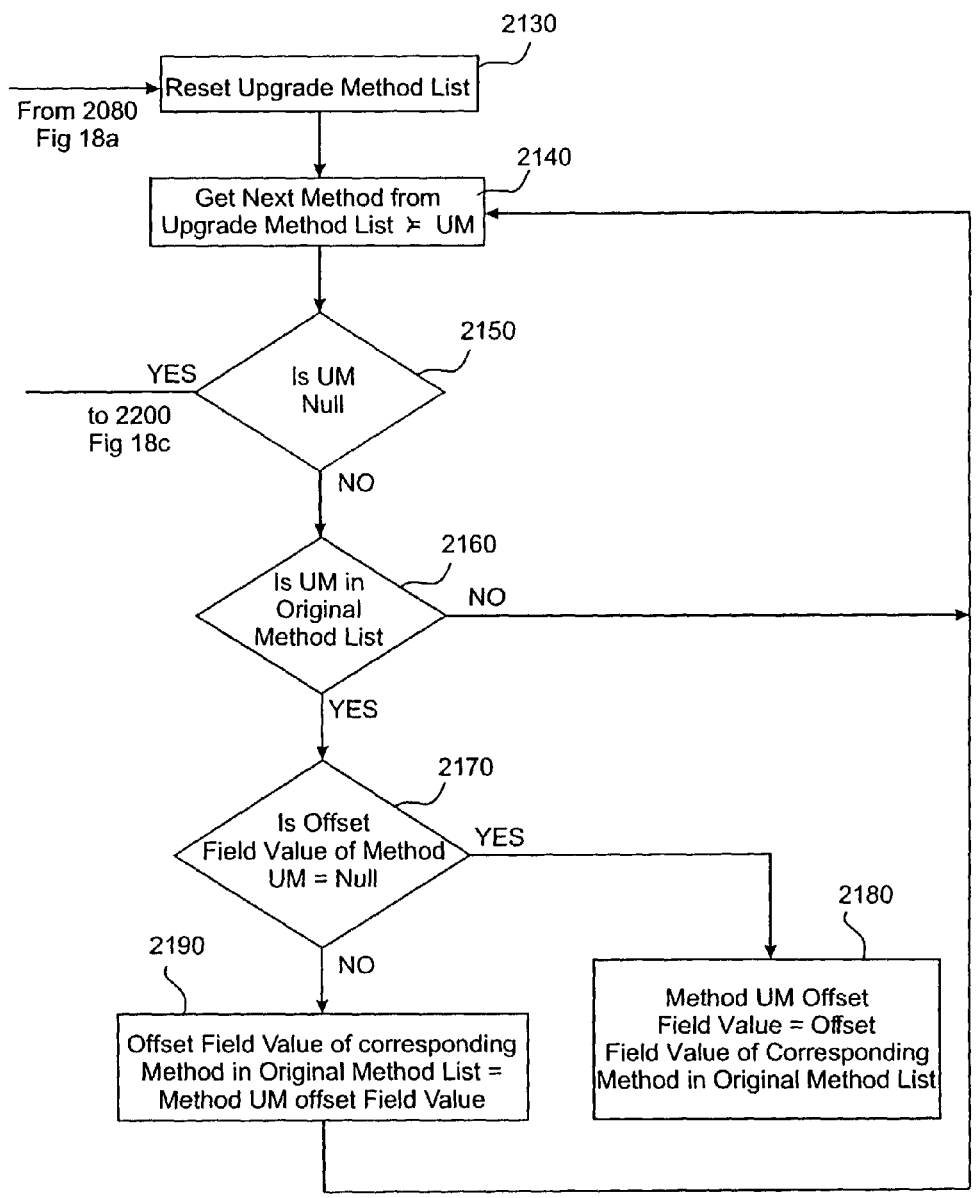
Figure 18C:
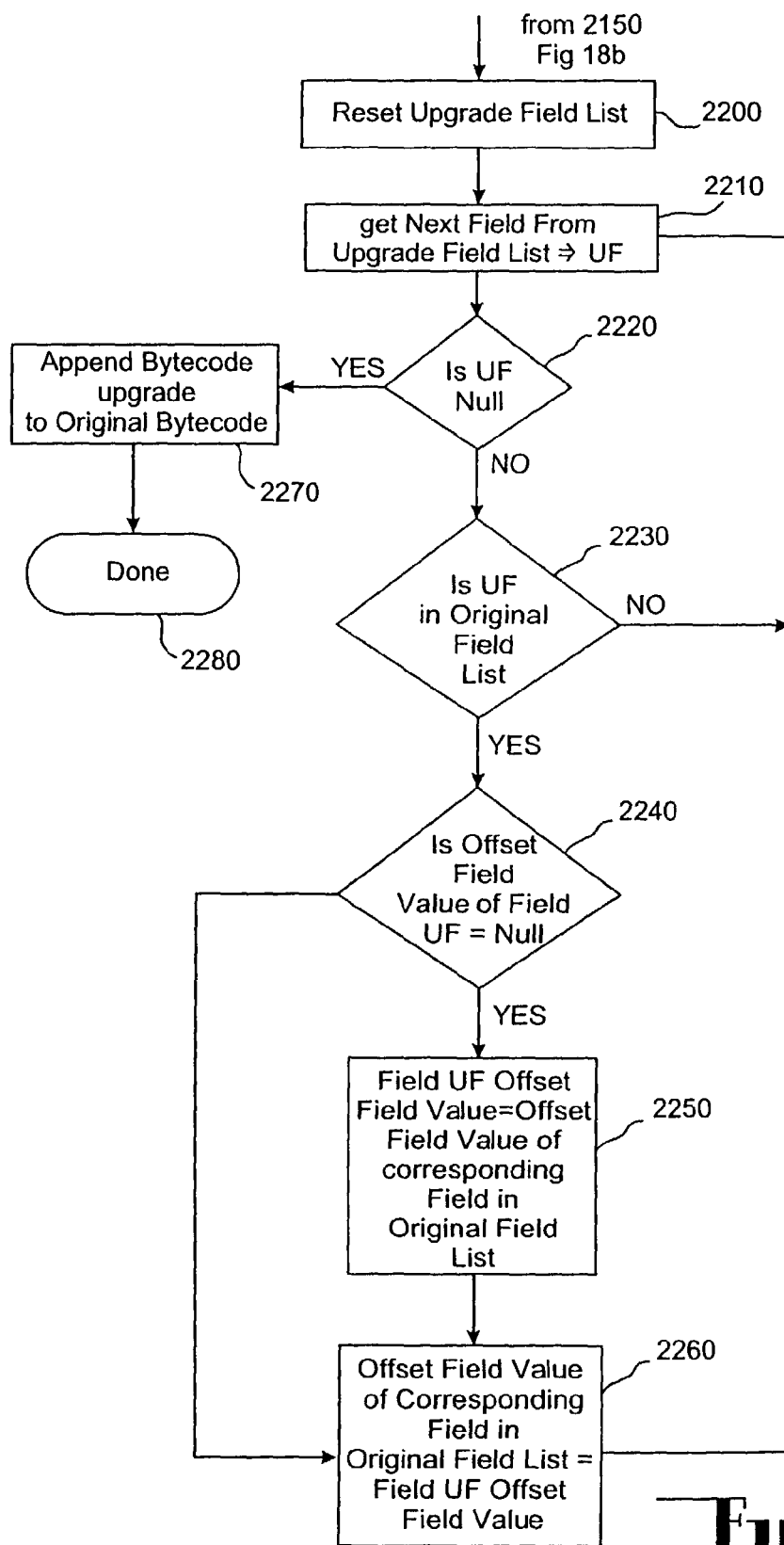

Phase 6, 1680, sees the classes, methods and fields defined and referenced in the upgrade bytecode 74 replaced with a reference to the appropriate entry in the appropriate canonical list. The phase commences with step 1690 and is illustrated in FIGS. 16 to 18.

Step 1690 commences by assigning the size, in memory address terms, of the concentrated original bytecode 72 to a variable OriginalBytecodeSize. Thereafter, the size, in memory terms, of the unconcentrated upgrade bytecode 74 is assigned to a variable UpgradeBytecodeSize. Processing then continues at step 1700.

At step 1700 a linear scan of the upgrade bytecode 74 commences for classes, methods and fields. The first identified reference to a class, method or field is assigned to a variable CMF. Processing then continues at step 1710.

At step 1710, the value of variable CMF is analysed to determine whether the reference is to a class. If CMF does reference a class, processing continues to step 1720. Otherwise, processing continues to step 1750.

Step 1720 compares the value of variable CMF, ie. the name of the class, against the names of classes already included in the UpgradeClassList. If the comparison determines that the class name, as recorded by variable CMF, has been included in the UpgradeClassList, processing continues to step 1730. If the comparison determines that the class name, as recorded by variable CMF, has not been included in the UpgradeClassList, an error is raised and appropriate error-handling procedures invoked at step 1740.

At step 1730, the reference to the class name replaced is with the index value of the corresponding class name in UpgradeClassList. For example, if the class name corresponded with the fifth entry in the UpgradeClassList, the reference to the class name would be replaced by the number 5. Processing then continues at step 1840.

The value of variable CMF is further analysed, at step 1750, to determine whether the reference is to a method. If CMF does reference a method, processing continues to step 1760. Otherwise processing continues to step 1790.

Step 1760 compares the value of variable CMF, i.e., the name of the method, against the names of methods already included in the UpgradeMethodList. If the comparison determines that the method name, as recorded by variable CMF, has been included in the UpgradeMethodList, processing continues to step 1770. If the comparison determines that the method name, as recorded by variable CMF, has not been included in the UpgradeMethodList, an error is raised and appropriate error-handling procedures invoked at step 1780.

At step 1770, the reference to the method name is replaced with the index value of the corresponding method name in UpgradeMethodList in the same manner as a class reference is replaced at step 1730. Processing then continues at step 1840.

Again, the value of variable CMF is analysed, at step 1790, to determine whether the reference is to a field. If CMF does reference a field, processing continues to step 1800. Otherwise, an error is raised and appropriate error-handling procedures invoked at step 1830.

Step 1800 compares the value of variable CMF, i.e., the name of the field, against the names of fields already included in the UpgradeFieldList. If the comparison determines that the field name, as recorded by variable CMF, has been included in the UpgradeFieldList, processing continues to step 1810. If the comparison determines that the field name, as recorded by variable CMF, has not been included in the UpgradeFieldList, an error is raised and appropriate error-handling procedures invoked at step 1820.

At step 1810, the reference to the field name is replaced with the index value of the corresponding field name in UpgradeFieldList in the same manner as a class reference is replaced at step 1730. Processing then continues at step 1840.

It should be noted that replacing class names, method names and field names with index values will affect the size of the upgrade bytecode 74. With the exception of the Offset Field for the first entry as processed at steps 1700 to 1830 above, this results in the Offset Field values for each defined class/method/field entry in their respective canonical list (i.e., UpgradeClassList, UpgradeMethodList and UpgradeFieldList) pointing to a memory address that does not correspond with the first memory address taken up by the defined class/method/field. Thus, there needs to be a means of correcting this error.

At step 1840 the linear scan of the upgrade bytecode 74 continues for further classes, methods and fields. When found, the class, method or field reference is assigned to the variable CMF. If the linear scan does not identify, at step 1845, any further classes, methods or fields in the upgrade bytecode 74, processing continues to Phase 7, 2040. Otherwise processing continues to step 1850.

At step 1850, the value of variable CMF is analysed to determine whether the reference is to a class. If CMF does reference a class, processing continues to step 1860. Otherwise, processing continues to step 1910.

Step 1860 compares the value of variable CMF, i.e., the name of the class, against the names of classes already included in the UpgradeClassList. If the comparison determines that the class name, as recorded by variable CMF, has been included in the UpgradeClassList, processing continues to step 1870. If the comparison determines that the class name, as recorded by variable CMF, has not been included in the UpgradeClassList, an error is raised and appropriate error-handling procedures invoked at step 1880.

At step 1870, the reference to the class name is replaced with the index value of the corresponding class name in UpgradeClassList. Thereafter, at step 1890, the Offset Field value for the class name is analysed. If the Offset Field value is set to its initialised value (such as a null value), processing returns to step 1840 where the linear scan resumes and the next class, method or field reference is processed.

If the Offset Field value is set to any value other than its initialised value, the Offset Field value is corrected at step 1900. This correction is achieved by determining the then current size, in memory address terms, of the upgrade bytecode 74 and subtracting from that value the value recorded by UpgradeBytecodeSize. This results in a "difference" value that is the result of previous replacements. The Offset Field value then being processed is then "corrected" by adding this "difference" value to the current value of the Offset Field.

Additionally, the value recorded by OriginalBytecodeSize is added to the current value of the Offset Field (incorporating the "difference value"). The reason for this is explained in more detail below.

Processing then returns to step 1840.

The value of variable CMF is further analysed, at step 1910, to determine whether the reference is to a method. If CMF does reference a method, processing continues to step 1920. Otherwise processing continues to step 1970.

Step 1920 compares the value of variable CMF, ie. the name of the method, against the names of methods already included in the UpgradeMethodList. If the comparison determines that the method name, as recorded by variable CMF, has been included in the UpgradeMethodList, processing continues to step 1930. If the comparison determines that the method name, as recorded by variable CMF, has not been included in the UpgradeMethodList, an error is raised and appropriate error-handling procedures invoked at step 1940.

At step 1930, the reference to the method name is replaced with the index value of the corresponding method name in UpgradeMethodList. Thereafter, at step 1950, the Offset Field value for the method name is analysed. If the Offset Field value is set to its initialised value (such as a null value), processing returns to step 1840 where the linear scan resumes and the next class, method or field reference is processed.

If the Offset Field value is set to any value other than its initialised value, the Offset Field value is corrected at step 1960. This correction is achieved by determining the then current size, in memory address terms, of the upgrade bytecode 74 and subtracting from that value the value recorded by UpgradeBytecodeSize. This results in a "difference" value that is the result of previous replacements. The Offset Field value then being processed is then "corrected" by adding this "difference" value to the current value of the Offset Field.

Additionally, the value recorded by OriginalBytecodeSize is added to the current value of the Offset Field (incorporating the "difference value"). Again, the reason for this is explained in more detail below.

Processing then returns to step 1840.

Again, the value of variable CMF is analyzed, at step 1970, to determine whether the reference is to a field. If CMF does reference a field, processing continues to step 1980. Otherwise, an error is raised and appropriate error-handling procedures invoked at step 1990.

Step 1980 compares the value of variable CMF, i.e., the name of the field, against the names of fields already included in the UpgradeFieldList. If the comparison determines that the field name, as recorded by variable CMF, has been included in the UpgradeFieldList, processing continues to step 2000. If the comparison determines that the field name, as recorded by variable CMF, has not been included in the UpgradeFieldList, an error is raised and appropriate error-handling procedures invoked at step 2010.

At step 2000, the reference to the field name is replaced with the index value of the corresponding method name in UpgradeMethodList. Thereafter, at step 2020, the Offset Field value for the method name is analysed. If the Offset Field value is set to its initialised value (such as a null value), processing returns to step 1840 where the linear scan resumes and the next class, method or field reference is processed.

If the Offset Field value is set to any value other than its initialised value, the Offset Field value is corrected at step 2030. This correction is achieved by determining the then current size, in memory address terms, of the upgrade bytecode 74 and subtracting from that value the value recorded by UpgradeBytecodeSize. This results in a "difference" value that is the result of previous replacements. The Offset Field value then being processed is then "corrected" by adding this "difference" value to the current value of the Offset Field.

Additionally, the value recorded by OriginalBytecodeSize is added to the current value of the Offset Field (incorporating the "difference value").

Processing then returns to step 1840.

Phase 7, 2040, commences with step 2050 (see FIG. 18). Step 2050 inserts the UpgradeClassList, the UpgradeMethodList and the UpgradeFieldList, as well as the local constant data arrays, in to virtual table 92. Virtual table 92, comprises a series of records. In addition to fields for storing canonical class lists, canonical method lists, canonical field lists and local constant data arrays, each record contains a unique identifier. In the embodiment presently being described, the unique identifier for each record is the size of the concentrated original bytecode, ie. the value of OriginalBytecodeSize. Records within the virtual table 92 are sorted, in ascending order, according to the value of the unique identifier.

Processing then continues to step 2060 where the UpgradeClassList of the newly inserted record is reset to its initial entry, ie. the entry pointed to by ClassListStart. The first class, ie. the class pointed to by ClassListStart, is then assigned, at step 2070, to a variable UC and the class recorded by variable UC will be referred to as "Class UC". In successive iterations of step 2070, variable UC is assigned the name of the next class in the UpgradeClassList of the newly inserted record. Upon reaching the end of the UpgradeClassList, i.e., the class pointed to by ClassListEnd has previously been processed, variable UC is assigned an "end-of-list" value (i.e., a null value).

At step 2080, Class UC is analysed. If Class UC has been assigned a null value, processing continues to step 2130. Otherwise, processing continues to step 2090.

At step 2090, Class UC is compared against the classes contained in the OriginalClassList (more particularly, the canonical class list of the record stored in the virtual table 92 that corresponds with the OriginalClassList). If a corresponding entry to Class UC is found in the OriginalClassList, processing continues to step 2100. Otherwise processing returns to step 2070 where the next class in the UpgradeClassList is processed.

The Offset Field value of Class UC is analysed, at step 2100, to determine whether this value is set to its initialised value. If so, the Offset Field value of Class UC is set, at step 2110, to equal the Offset Field value of the class corresponding to Class UC in the OriginalClassList. If the Offset Field value of Class UC is set to a value other than its initialised value, then, at step 2120, the Offset Field value of the class corresponding to Class UC in the OriginalClassList is set to equal the Offset Field value of Class UC.

The former arrangement thus allows the UpgradeClassList to correctly reference classes defined in the OriginalClassList, while the latter arrangement allows for dynamic upgrading of existing classes by pointing the original entry to the start of the bytecode that forms the upgraded class.

Processing then returns to step 2070 where the next class in the UpgradeClassList is processed.

At step 2130 the UpgradeMethodList of the newly inserted record is reset to its initial entry, i.e., the entry pointed to by MethodListStart. The first method, ie. the method pointed to by MethodListStart, is then assigned, at step 2140, to a variable UM and the method recorded by variable UM will be referred to as "Method UC".

In successive iterations of step 2140, variable UM is assigned the name of the next method in the UpgradeMethodList of the newly inserted record. Upon reaching the end of the UpgradeMethodList, i.e., the method pointed to by MethodListEnd has previously been processed, variable UM is assigned an "end-of-list" value (i.e., a null value).

At step 2150, Method UM is analysed. If Method UM has been assigned a null value, processing continues to step 2200. Otherwise, processing continues to step 2160.

At step 2160, Method UM is compared against the methods contained in the OriginalMethodList (more particularly, the canonical method list of the record stored in the virtual table 92 that corresponds with the OriginalMethodList). If a corresponding entry to Method UM is found in the OriginalMethodList, processing continues to step 2170. Otherwise processing returns to step 2140 where the next method in the UpgradeMethodList is processed.

The Offset Field value of Method UM is analysed, at step 2170, to determine whether this value is set to its initialised value. If so, the Offset Field value of Method UM is set, at step 2180, to equal the Offset Field value of the method corresponding to Method UM in the OriginalMethodList. If the Offset Field value of Method UM is set to a value other than its initialised value, then, at step 2190, the Offset Field value of the method corresponding to Method UM in the OriginalMethodList is set to equal the Offset Field value of Method UM.

The former arrangement thus allows the UpgradeMethodList to correctly reference methods defined in the OriginalMethodList, while the latter arrangement allows for dynamic upgrading of existing methods by pointing the original entry to the start of the bytecode that forms the upgraded method.

Processing then returns to step 2140 where the next method in the UpgradeMethodList is processed.

Step 2200 sees the UpgradeFieldList of the newly inserted record reset to its initial entry, i.e., the entry pointed to by FieldListStart. The first field, i.e., the field pointed to by FieldListStart, is then assigned, at step 2210, to a variable UF and the field recorded by variable UF will be referred to as "Field UF".

In successive iterations of step 2210, variable UF is assigned the name of the next field in the UpgradeFieldList of the newly inserted record. Upon reaching the end of the UpgradeFieldList, i.e., the field pointed to by FieldListEnd has previously been processed, variable UF is assigned an "end-of-list" value (i.e., a null value).

At step 2220, Field UF is analysed. If Field UF has been assigned a null value, processing continues to step 2270. Otherwise, processing continues to step 2230.

At step 2230, Field UF is compared against the fields contained in the OriginalFieldList (more particularly, the canonical field list of the record stored in the virtual table 92 that corresponds with the OriginalFieldList). If a corresponding entry to Field UF is found in the OriginalFieldList, processing continues to step 2240. Otherwise processing returns to step 2210 where the next field in the UpgradeFieldList is processed.

The Offset Field value of Field UF is analysed, at step 2240, to determine whether this value is set to its initialised value. If so, the Offset Field value of Field UF is set, at step 2250, to equal the Offset Field value of the field corresponding to Field UF in the OriginalFieldList. If the Offset Field value of Field UF is set to a value other than its initialised value, then, at step 2260, the Offset Field value of the field corresponding to Field UF in the OriginalFieldList is set to equal the Offset Field value of Field UF.

The former arrangement then allows the UpgradeFieldList to correctly reference fields defined in the OriginalFieldList, while the latter arrangement allows for dynamic upgrading of existing fields by pointing the original entry to the start of the bytecode that references the upgraded field.

Processing then returns to step 2210 where the next class in the UpgradeClassList is processed.

At step 2270, the upgrade bytecode 74 is appended to the original bytecode 72 to form an integrated bytecode 76. Once integrated, the upgrade process is completed, as illustrated at step 2280.

It should be noted that steps 2040 to 2260 is performed at the site of the virtual table, which may be the location of the data processing system 40 containing the original bytecode or some other remote system. Furthermore, in alternative embodiments, the actions that form step 2050 can be delayed and performed in conjunction with step 2270.

Figure 19:
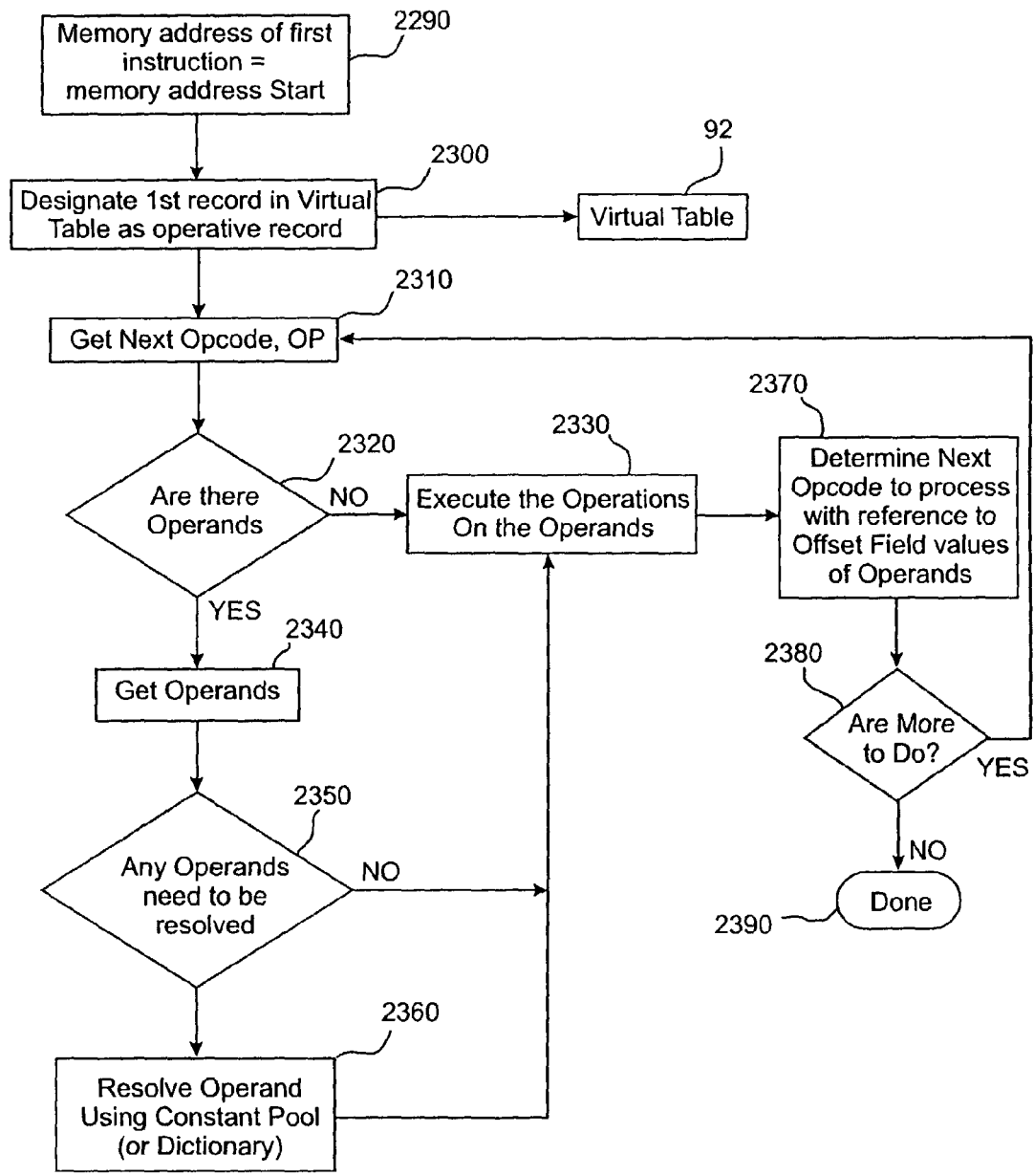
FIG. 19 is a flow diagram of an exemplary method of executing bytecode condensed in accordance with the present invention.

Execution of the integrated bytecode 76 will now be described with reference to FIGS. 19 and 20.

At step 2290, the memory address of the first instruction in the integrated bytecode is assigned to variable MemoryAddressStart. Thereafter, at step 2300, the first record in the virtual table is designated the "operative" record. The canonical list of classes, methods and fields of the operative record form the "ClassList", "MethodList" and "FieldList" referred to below. Similarly, the local constant data arrays associated with the canonical list of classes of the operative record forms the local constant data array.

Processing then continues as follows.

Each instruction in the integrated bytecode 76 consists of an opcode specifying the operation to be performed, followed by zero or more operands supplying arguments or data to be used by the operation. As shown in FIG. 19, the first step in the execution of an instruction is to fetch the opcode, step 2310. At step 2320, it is determined whether the opcode fetched has any operands associated with it. If not, operation branches forward to step 2330 in which the operation specified by the opcode is executed.

If there are operands, operation proceeds to step 2340 in which the operands are fetched from the bytecode. Operation then proceeds to step 2350 in which it is determined whether any of the fetched operands needs to be resolved. Generally, an operand will need to be resolved if it is not a literal constant. Opcodes that refer to classes, methods of fields have operands that need to be resolved. The type of operand is implied by the opcode. For example, the "putfield" operation take a value of the stack and moves it into the field of an object. The operand which immediately follows the "putfield" operator in the bytecode is a field identifier which specifies the field. In bytecode concentrated in accordance with the present invention, the operand will be an index into the FieldList.

If no operand needs to be resolved, operation proceeds to step 2330 in which the operation specified by the opcode is executed using the operands. If there are operands to be resolved, operation proceeds to step 2360 in which the operands are resolved. This procedure will be described in greater detail below with reference to FIG. 20. Once the operands have been resolved, operation continues to step 2330 in which the operation specified by the opcode is carried out with the resolved operands. Thereafter, at step 2370, the next opcode to be processed is determined with reference to the Offset Field values of the operands.

Once the current instruction is executed, it is determined in step 2380 whether there are more instructions in the integrated bytecode 76 to be executed. If there are, operation loops back to step 2310 in which the next opcode to be executed is fetched. If there are no more instructions to be executed, operation terminates at step 2390.

Figure 20:
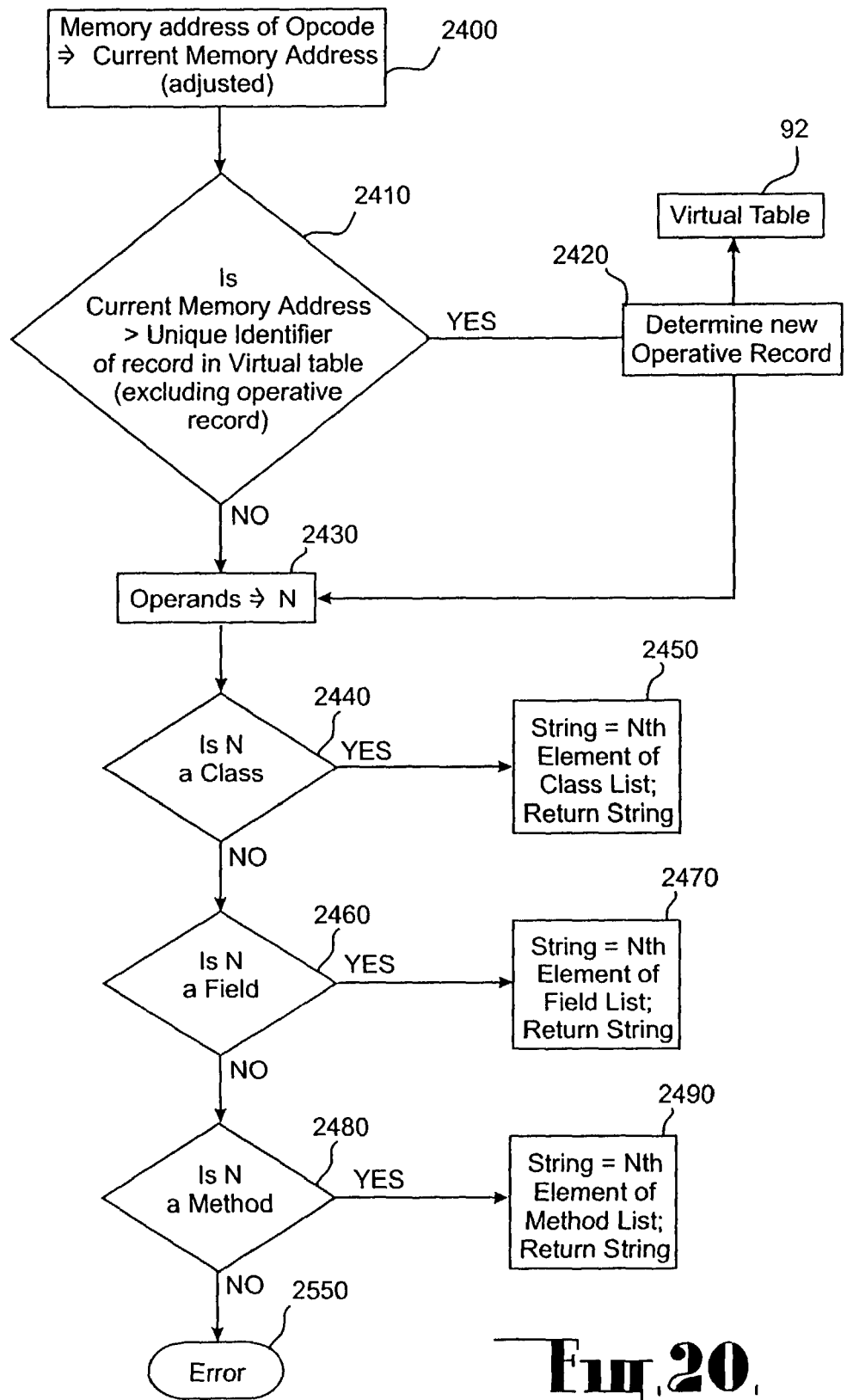
FIG. 20 is a flow diagram of an exemplary method of resolving operands of bytecode condensed in accordance with the present invention.

FIG. 20 illustrates an exemplary procedure for resolving operands in accordance with the present invention. In step 2400, the memory address of the opcode, to which the operand then being processed relates, is assigned to a variable CurrentMemoryAddress.

The value of CurrentMemoryAddress is then adjusted by subtracting the value of MemoryAddressStart to determine the relative offset value of the opcode.

The value of CurrentMemoryAddress is then analysed at step 2410. If the value of CurrentMemoryAddress is greater than the value of the unique identifier for any record in the virtual table 92, other than the unique identifier for the current operative record, processing continues to step 2420. Otherwise, processing continues at step 2430.

At step 2420, a new record is designated as the operative record. The new operative record is the record having a unique identifier value closest to, but not exceeding, the value of CurrentMemoryAddress. Once identified, the ClassList, MethodList and FieldList are changed to reflect those recorded in the new operative record. Processing then continues to step 2430.

Step 2430 sees the operand to be resolved assigned to a variable N. In step 2440, it is determined whether the operand is a class. As discussed above, the type of operand is implied from the opcode. If the operand N is a class, operation proceeds to step 2450 in which the operand itself is used as an index into the ClassList.

At step 2450, and using the operand as an index to the ClassList, a string is retrieved from the ClassList which is the identifier of the class which is the operand. The retrieved string replaces the index, and operation either proceeds to step 2330 if all operands that need to be resolved have been resolved, or to step 2430 if there are more operands to be resolved.

If at step 2440 it is determined that the operand N is not a class, operation proceeds to step 2460 in which it is determined whether the operand to be resolved is a field. If it is determined that the operand N is a field, operation proceeds to step 2470 in which the operand itself is used as an index into the FieldList.

At step 2470, and using the operand as an index to the FieldList, a string is retrieved from the FieldList which is the identifier of the field which is the operand. The retrieved string replaces the index, and operation either proceeds to step 2330 is all operands that need to be resolved have been resolved, or to step 2430 if there are more operands to be resolved.

If at step 2460 it is determined that the operand N is not a field, operation proceeds to step 2480 in which it is determined whether the operand to be resolved is a method. If it is determined that the operand N is a method, operation proceeds to step 2490 in which the operand itself is used as an index into the MethodList.

At step 2490, and using the operand as an index to the MethodList, a string is retrieved from the MethodList which is the identifier of the method which is the operand.

The retrieved string replaces the index, and operation either proceeds to step 2330 is all operands that need to be resolved have been resolved, or to step 2430 if there are more operands to be resolved.

If at step 2480 it is determined that the operand is not a method, an error is raised and appropriate error-handling procedures invoked at step 2500.

It is possible to use the invention described herein for multiple upgrades of the original bytecode 72. When doing so the integrated bytecode 76 formed from previous upgrades constitutes the original bytecode 72. The unique identifier for each record created by such upgrade is then allocated a value equal to the total size, in memory address terms, of the original bytecode 72 and the subsequent appended upgrade bytecode(s) 74.

One skilled in the art will appreciate that the present invention can be practiced by other than the preferred embodiments which are presented herein for purposes of illustration and not of limitation.

We claim:

1. A method of dynamically updating concentrated executable computer code in a computer system, the method comprising:
    creating a concentrated upgrade code for undating the concentrated code;
    creating indexed lists for the concentrated code and for the concentrated upgrade code, the indexed list for the concentrated code having a plurality of index references for code identifiers of code structures in the concentrated code, and the indexed list for the concentrated upgrade code having a plurality of index references for identifiers of the code structures in the concentrated upgrade code;
    storing the indexed lists in a virtual table; and
    integrating the concentrated code with the concentrated upgrade code to form an integrated code,
    wherein the virtual table contains an operable part referable by the integrated code such that when a code structure being executed originates from the concentrated code the indexed list for the concentrated code is stored in the operable part of the virtual table, and when a code structure being executed originates from the concentrated upgrade code the indexed list for the concentrated upgrade code is stored in the operable part of the virtual table.

2. The method of claim 1, wherein creating the indexed list for the concentrated upgrade code comprises creating an indexed upgrade list having offset fields indicating offsets of corresponding code structures in the indexed upgrade list from a first memory address of the concentrated upgrade code.

3. The method of claim 1, wherein creating the concentrated upgrade code comprises replacing identifiers of code structures in an un-concentrated upgrade code with index references corresponding to the identifiers of the code structures in the un-concentrated upgrade code.

4. The method of claim 3, wherein replacing identifiers of the code structures in the un-concentrated upgrade code comprises replacing identifiers of class-type code stuctures, method-type code structures, and field-type code structures.

5. The method of claim 3, wherein creating the indexed list for the concentrated upgrade code comprises creating an indexed upgrade list having offset fields indicating offsets of corresponding code structures in the indexed upgrade list from a first memory address of the concentrated upgrade code,
    the method further comprising correcting values in the offset fields to account for change in size of the concentrated upgrade code from the un-concentrated upgrade code.

6. The method of claim 5, wherein correcting the values of the offset fields comprises:
    determining a difference value between a size of the concentrated upgrade code and a size of the un-concentrated upgrade code; and
    adjusting the values of the offset fields according to the difference value.

7. The method of claim 1, further comprising:
    determining whether a particular code structure in the indexed list for the concentrated upgrade code contains a reference to local constant data; and
    in response to determining that the particular code structure contains the reference to the local constant data, storing a name of the referenced local constant data in an array of local constant data, and replacing the reference to the local constant data in the particular code structure with a value representing a position of the referenced local constant data in the array.

8. The method of claim 1, wherein the indexed lists comprise first indexed lists for first type code structures in the concentrated code and concentrated upgrade code, the method further comprising:
    creating a second indexed list for the concentrated code having a plurality of index references for second type code structures in the concentrated code;

creating a second indexed list for the concentrated upgrade code having a plurality of index references for second type code structure in the concentrated upgrade code; and storing the second indexed lists in the virtual table.

9. The method of claim 8, further comprising:

creating a third indexed list for the concentrated code having a plurality of index references for third type code structures in the concentrated code;

creating a third indexed list for the concentrated upgrade code having a plurality of index references for third type code structures in the concentrated upgrade code; and storing the third indexed lists in the virtual table.

10. A method of dynamically updating concentrated executable computer code with upgrade code in a computer system, the method comprising:

creating indexed lists for the concentrated code and for the upgrade code, the indexed lists comprising a first indexed list for the concentrated code having a plurality of index references for code identifiers of first type code structures in the concentrated code, and a first indexed upgrade list for the upgrade code having a plurality of index references for identifiers of the first type code structures in the upgrade code, wherein each of the first indexed list and the first indexed upgrade list further has offset fields indicating offsets of corresponding first type code structures;

setting an offset field of a particular first type code structure in the first indexed list to a value of an offset field of a corresponding first type code structure in the first indexed upgrade list in response to determining that the particular first type code structure in the first indexed list has been upgraded;

integrating the concentrated code with the upgrade code to form an integrated code; and storing the indexed lists in a virtual table;

wherein the virtual table contains an operable part referable by the integrated code such that when a code structure being executed originates from the concentrated code the indexed list for the concentrated code is stored in the operable part of the virtual table, and when a code structure being executed originates from the upgrade code the indexed list for the upgrade code is stored in the operable part of the virtual table.

11. The method of claim 10, further comprising setting an offset field of a second particular first type code structure in the first indexed upgrade list to a value of an offset field of a corresponding first type code structure in the first indexed list in response to determining that upgrade of the corresponding first type code structure in the first indexed list has not occurred.

12. The method of claim 10, wherein the upgrade code comprises concentrated upgrade code, the concentrated upgrade code created from un-concentrated upgrade code by:

scanning the un-concentrated upgrade code; and replacing each occurrence of an identifier of the first type code structure in the un-concentrated upgrade code with a corresponding index reference in the first indexed upgrade list.

13. The method of claim 10, wherein creating the indexed lists for the concentrated code and the upgrade code comprises creating the indexed lists for first type code structures that are one of class-type code structures, method-type code structures, and field-type code structures.

14. The method of claim 10, wherein the offset fields in the first indexed list contain offsets of corresponding first type code structures in the first indexed list from a first memory address of the concentrated code, and wherein the offset fields in the first indexed upgrade list contain offsets of corresponding first type code structures in the first indexed upgrade list from a first memory address of the upgrade code.

15. A data storage medium including machine readable code for upgrading concentrated code with upgraded code, the machine readable code when executed causing a computer system to:

create indexed lists for the concentrated code and for the upgrade code, the indexed list for the concentrated code having a plurality of index references for code identifiers of code structures in the concentrated code, and the indexed list for the upgrade code having a plurality of index references for identifiers of the code structures in the upgrade code;

store the indexed lists in a virtual table;

integrate the concentrated code with the upgrade code to form an integrated code; and execute the integrated code, wherein the virtual table contains an operable part referable by the integrated code such that when a code structure being executed originates from the concentrated code the indexed list for the concentrated code is stored in the operable part of the virtual table, and when a code structure being executed originates from the upgrade code the indexed list for the upgrade code is stored in the operable part of the virtual table.

16. A data processing system comprising:

at least one processor; and software executable on the at least one processor to upgrade concentrated code with upgrade code by:

creating indexed lists for the concentrated code and for the upgrade code, the indexed lists comprising a first indexed list for the concentrated code having a plurality of index references for code identifiers of first type code structures in the concentrated code, and a first indexed upgrade list for the upgrade code having a plurality of index references for identifiers of the first type code structures in the upgrade code, wherein each of the first indexed list and the first indexed upgrade list further has offset fields indicating offsets of corresponding first type code structures;

setting an offset field of a particular first type code structure in the first indexed list to a value of an offset field of a corresponding first type code structure in the first indexed upgrade list in response to determining that the particular first type code structure in the first indexed list has been upgraded;

integrating the concentrated code with the upgrade code to form an integrated code; and storing the indexed lists in a virtual table;

wherein the virtual table contains an operable part referable by the integrated code such that when a code structure being executed originates from the concentrated code the indexed list for the concentrated code is stored in the operable part of the virtual table, and when a code structure being executed originates from the upgrade code the indexed list for the upgrade code is stored in the operable part of the virtual table.

17. The data processing system of claim 16, wherein the software is executable to further set an offset field of a second particular first type code structure in the first indexed upgrade list to a value of an offset field of a corresponding first type code structure in the first indexed list in response to determining that upgrade of the corresponding first type code structure in the first indexed list has not occurred.

18. The data processing system of claim 16, wherein the offset fields in the first indexed list contain offsets of corresponding first type code structures in the first indexed list from a first memory address of the concentrated code, and wherein the offset fields in the first indexed upgrade list contain offsets of corresponding first type code structures in the first indexed upgrade list from a first memory address of the upgrade code.

* * * * *